United States Patent
Fukuda et al.

(10) Patent No.: US 6,877,216 B2
(45) Date of Patent: Apr. 12, 2005

(54) HEAT-SEALING MACHINE, HEAT-SEALING METHOD, EMBOSSING METHOD, WORK PRESSING MACHINE AND WORKPIECE

(75) Inventors: Jun Fukuda, Tokyo-to (JP); Masataka Okushita, Tokyo-to (JP); Kazuki Yamada, Tokyo-to (JP); Rikiya Yamashita, Tokyo-to (JP); Hiroshi Miyama, Tokyo-to (JP)

(73) Assignee: Dai Nippon Printing Co., Ltd. (JP)

( * ) Notice: Subject to any disclaimer, the term of this patent is extended or adjusted under 35 U.S.C. 154(b) by 350 days.

(21) Appl. No.: 09/936,512

(22) PCT Filed: Jan. 26, 2001

(86) PCT No.: PCT/JP01/00530

§ 371 (c)(1),
(2), (4) Date: Sep. 14, 2001

(87) PCT Pub. No.: WO01/54985

PCT Pub. Date: Aug. 2, 2001

(65) Prior Publication Data

US 2002/0157242 A1 Oct. 31, 2002

(30) Foreign Application Priority Data

Jan. 26, 2000 (JP) .................................. 2000-017337
Jan. 26, 2000 (JP) .................................. 2000-017343
Feb. 16, 2000 (JP) .................................. 2000-037490

(51) Int. Cl.$^7$ ................. B23P 19/00; H01M 2/02; H01M 2/08
(52) U.S. Cl. .................. 29/730; 429/171; 429/172; 429/173; 429/180; 429/181
(58) Field of Search ................. 429/171, 172, 429/173, 179, 178, 180, 181; 29/730; 156/349, 350, 358, 441.5, 442, 500, 580, 581, 583.1

(56) References Cited

U.S. PATENT DOCUMENTS 3,671,709 A * 6/1972 Gidge .................. 219/765
5,197,994 A * 3/1993 Brocksmith .......... 429/175
5,563,007 A * 10/1996 Young et al. ......... 429/139
6,207,318 B1 * 3/2001 Wessel et al. ........ 429/163

FOREIGN PATENT DOCUMENTS

| EP | 1 160 892 A1 | 12/2001 |
| JP | 55-128435 | 10/1980 |
| JP | 61-198550 | 9/1986 |
| JP | 05-220832 | 8/1993 |
| JP | 10-284021 | 10/1998 |
| JP | 11-105939 | 4/1999 |
| JP | 11-245287 | 9/1999 |
| JP | 10-270059 | 10/1999 |
| JP | 2001-205701 | 7/2001 |
| JP | 2001-219468 | 8/2001 |
| JP | 2003-245970 | 9/2003 |

* cited by examiner

Primary Examiner—Carol Chaney
Assistant Examiner—Julian Mercado
(74) Attorney, Agent, or Firm—Parkhurst & Wendel, L.L.P.

(57) ABSTRACT

A polymer battery module (2) provided with tabs (4) is put in a package (5) and an open end part of the package (5) is heat-sealed by a heat-sealing machine (10). The heat-sealing machine (10) is provided with a pair of sealing heads (10a, 10b) respectively having sealing surfaces (12). The sealing surfaces (12) of the sealing heads (10a, 10b) are provided with recesses (11) in parts thereof corresponding to the tabs (4) of the polymer battery module (2) contained in the package (5) as located in place between the sealing heads (10a, 10b) for heat-sealing.

26 Claims, 14 Drawing Sheets

HEAT-SEALING MACHINE, HEAT-SEALING METHOD, EMBOSSING METHOD, WORK PRESSING MACHINE AND WORKPIECE

TECHNICAL FIELD

The present invention relates to a heat-sealing machine, heat-sealing method, an embossing method, a work pressing machine and a workpiece for fabricating a polymer battery.

BACKGROUND ART

A polymer battery, which is also called a lithium secondary battery, generates current by the migration of lithium ions. The polymer battery includes a polymer battery module having a polyelectrolyte and positive and negative electrodes formed of active polymers, and a protective package for containing the polymer battery module.

The polymer battery is used as a power supply for personal computers, portable terminal devices (portable telephone sets and PDAs), video cameras, electric vehicles, energy storage batteries, robots, artificial satellites and the like.

The package of the polymer battery is a cylindrical or parallelepipedic metal can formed by pressing a metal sheet or a pouch formed by processing a laminated sheet consisting of a base layer, an aluminum layer and a sealant layer.

Such known packages for polymer batteries have the following problems. The metal can has rigid walls and hence the shape of the lithium battery module is dependent on that of the metal can. Since the hardware is designed so as to conform to the shape of the battery, the dimensions of the hardware are dependent on the shape of the battery, which reduces the degree of freedom of designing the shape of the hardware.

A pouch formed by heat-sealing two laminated sheets to contain a polymer battery module therein and an embossed package formed in the shape of a vessel by subjecting the laminated sheet to an embossing process to contain a polymer battery therein have been developed. The embossed package, as compared with the pouch, is a compact package. Satisfactory moistureproof property, strength including piecing resistance and insulating property are essential to polymer battery packages.

The polymer battery module is put in a package and peripheral parts of the package is heat-sealed hermetically. The polymer battery module is provided with electrodes having the shape of a plate, i.e., tabs, to supply an electric current produced therein to an external device. Therefore, the tabs are sandwiched between the walls of the package when sealing the package by heat-sealing. Since the tabs have a thickness in the range of 50 to 200 µm, it is possible that a resin forming the heat-sealable layer of the package is unable to fill up unsealed gaps formed beside the opposite sides of the tabs and the package cannot be sealed perfectly.

DISCLOSURE OF THE INVENTION

The present invention has been made in view of the aforesaid problem and it is therefore an object of the present invention to provide a heat-sealing machine, a heat-sealing method, an embossing method, a work pressing machine and a workpiece capable of accurately fabricating a polymer battery.

The present invention provides a heat-sealing machine for heat-sealing an end part of a package containing a polymer battery module provided with tabs, including a pair of sealing heads each provided with a sealing surface, wherein the sealing surface of at least one of the sealing heads is provided with recesses in parts thereof corresponding to the tabs placed in the end part of the package.

The present invention provides a heat-sealing method including the steps of putting a polymer battery module provided with tabs in a pouch package having one unsealed part through the unsealed part so that the tabs are placed in the unsealed part of the pouch package, and heat-sealing the unsealed part of the pouch with a pair of sealing heads respectively having sealing surfaces, at least one of which being provided with recesses in parts corresponding to the tabs.

The present invention provides a heat-sealing method including the steps of putting a polymer battery module provided with tabs in an embossed package, and heat-sealing the embossed package with a pair of sealing heads respectively having sealing surfaces, at least one of which being provided with recesses in parts corresponding to the tabs.

The present invention provides an embossing method of embossing a workpiece having a plurality of package sections by using an embossing machine provided with a male die part having male corrugated parts formed so as to correspond to boundary parts between the adjacent package sections of the workpiece, a male pressing part extending between the male corrugated parts and a male forming part placed in an opening formed in the male pressing part, and a female die part having female corrugated parts corresponding to the male corrugated parts, and a female pressing part provided with a forming recess corresponding to the male forming part includes the steps of forming cuts in a part of each of the package sections of the workpiece corresponding to the male pressing part and the female pressing part, and forming an embossed hollow part in each package section of the workpiece by embossing the workpiece with the male and the female die part.

The present invention provides a workpiece comprising a plurality of package forming sections, which is to be embossed by an embossing machine provided with a male die part having male corrugated parts formed so as to correspond to boundary parts between the adjacent package sections of the workpiece, a male pressing part extending between the male corrugated parts and provided with an opening, and a male forming part placed in the opening formed in the male pressing part, and a female die part having female corrugated parts corresponding to the male corrugated parts, a female pressing part extending between the female corrugated parts and provided with a forming recess corresponding to the male forming part, further comprising cuts in parts of each package section to be placed between the male pressing part and the female pressing parts.

The present invention provides a workpiece pressing machine for pressing a part of a workpiece other than a part having an embossed hollow part formed by embossing of the workpiece includes a first die part provided with a recess for receiving the embossed part of the workpiece and disposed on one side of the workpiece, and a second die part disposed on the other side of the workpiece to compress the workpiece between the first and the second die part; wherein at least either the first or the second die part is heated.

BEST MODE FOR CARRYING OUT THE INVENTION

First Embodiment

A heat-sealing machine according to the present invention for sealing a polymer battery module provided with tabs in a package so that the tabs are held between walls of the package by a heat-sealing process is capable of preventing the formation of unsealed gaps beside the tabs. Sealing heads included in the heat-sealing machine are capable of effectively applying pressure and temperature necessary for perfect sealing to parts of the package corresponding to the opposite sides of the tabs. The heat-sealing machine will be described with reference to the drawings.

Figure 1:
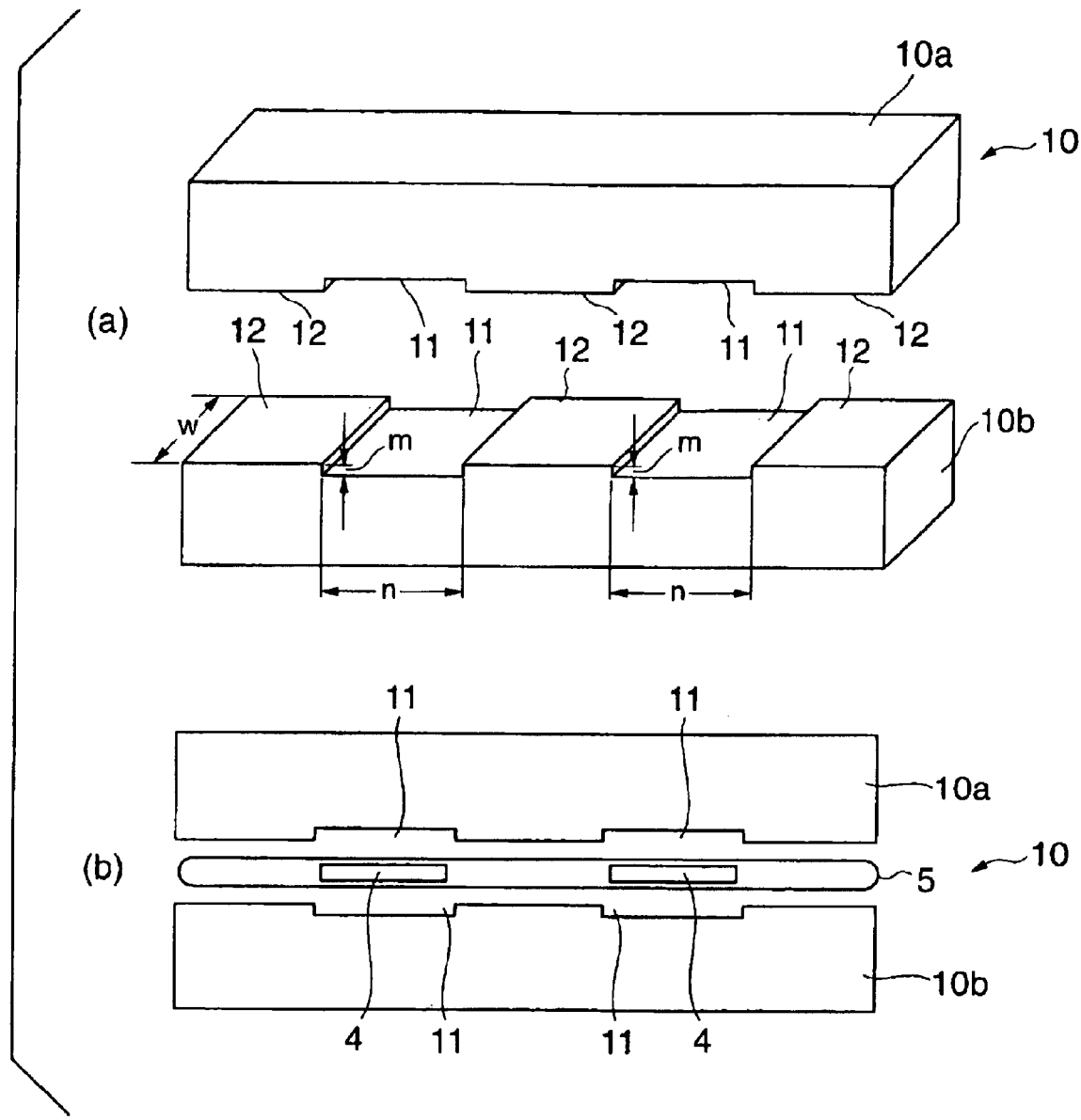
FIG. 1 is a view of a heat-sealing machine according to the present invention to be applied to packaging a polymer battery module.

FIG. 1(a) is a perspective view of assistance in explaining the shapes of sealing heads for sealing a polymer battery module in a package and FIG. 1(b) is a typical view of assistance in explaining a heat-sealing operation.

Figure 2:
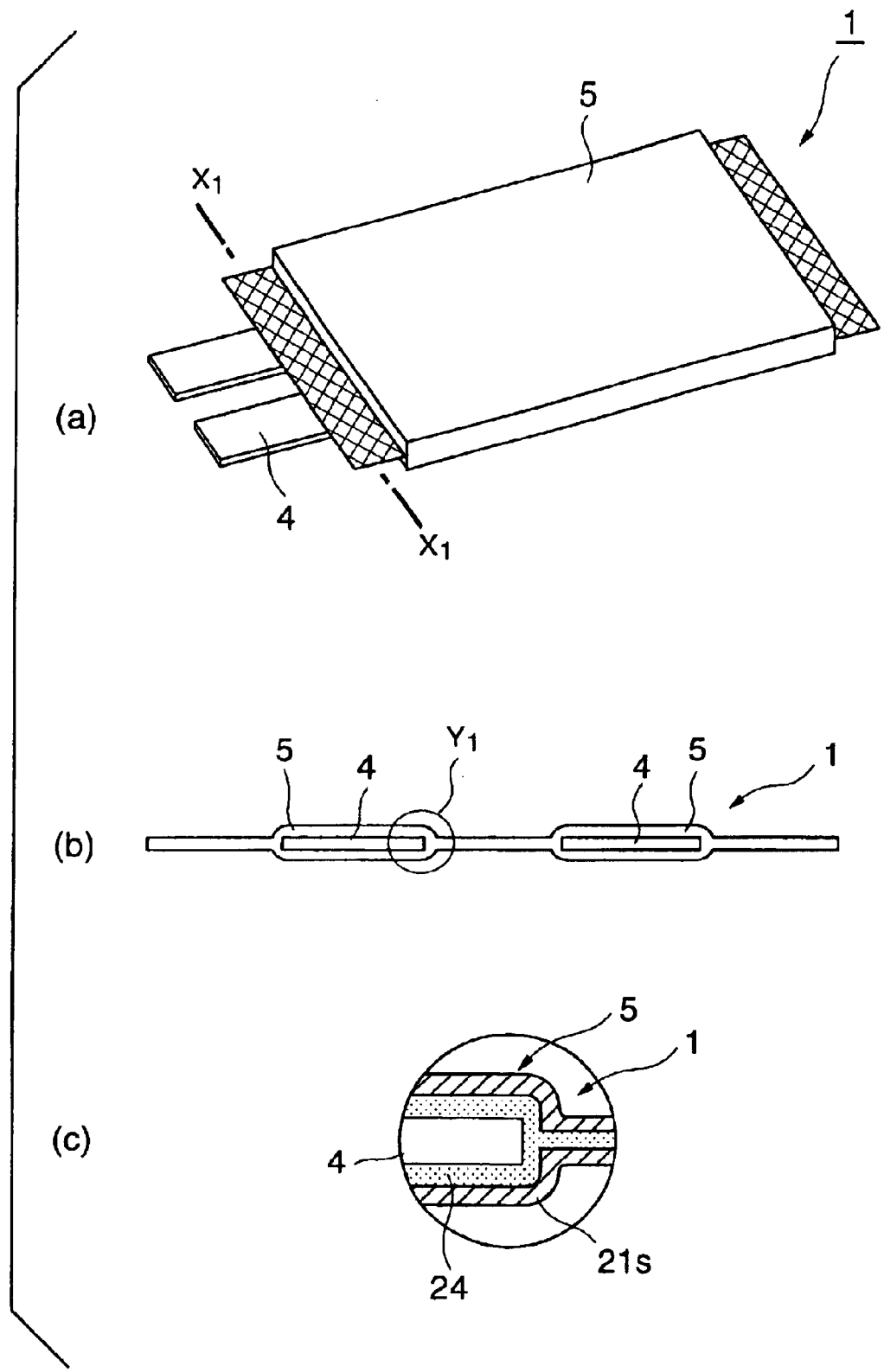
FIG. 2 is a view of a polymer battery formed by using the heat-sealing machine of the present invention for packaging a polymer battery module.
Figure 3:
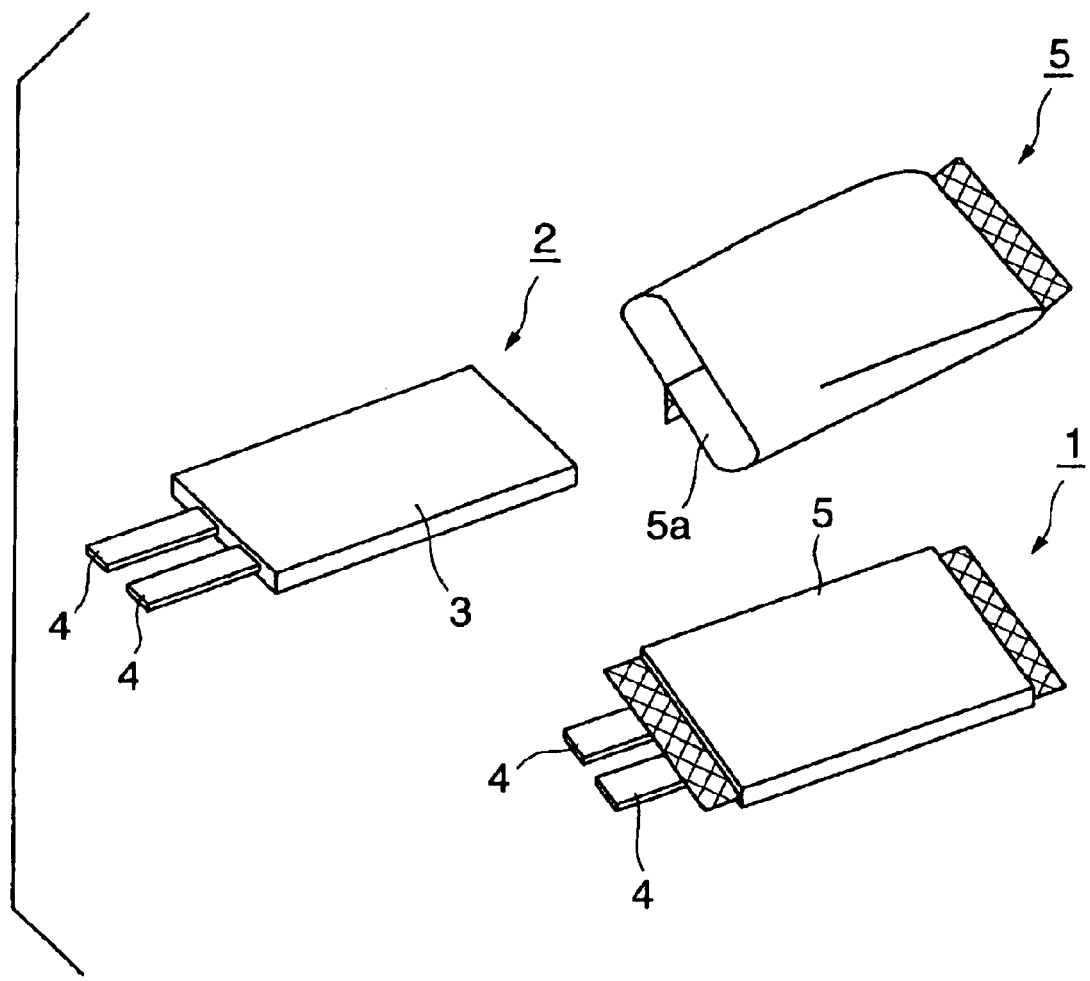
FIG. 3 is a perspective view of assistance in explaining a pouch for a polymer battery.
Figure 4:
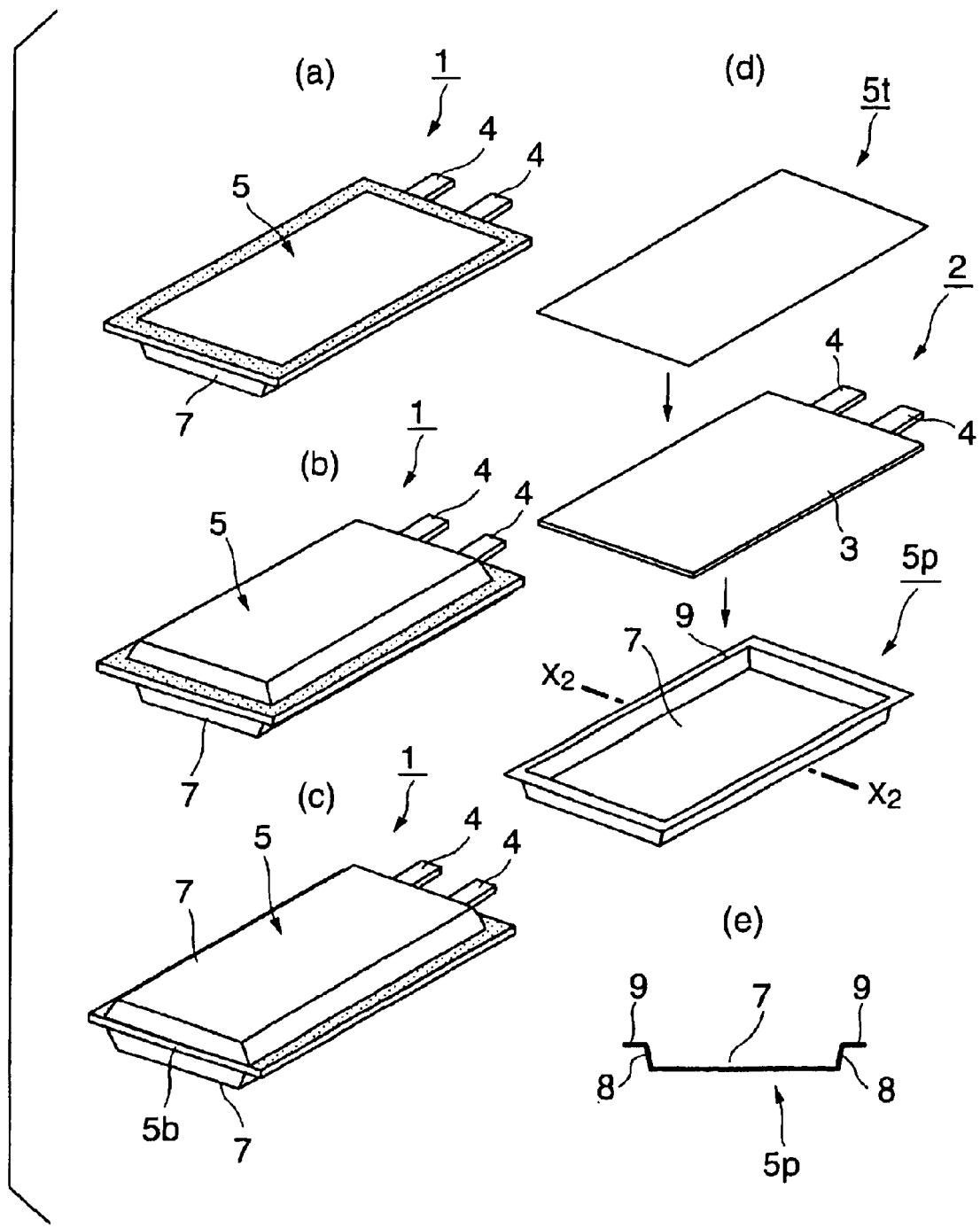
FIG. 4 is a view of assistance in explaining an embossed package for a polymer battery.
Figure 5:
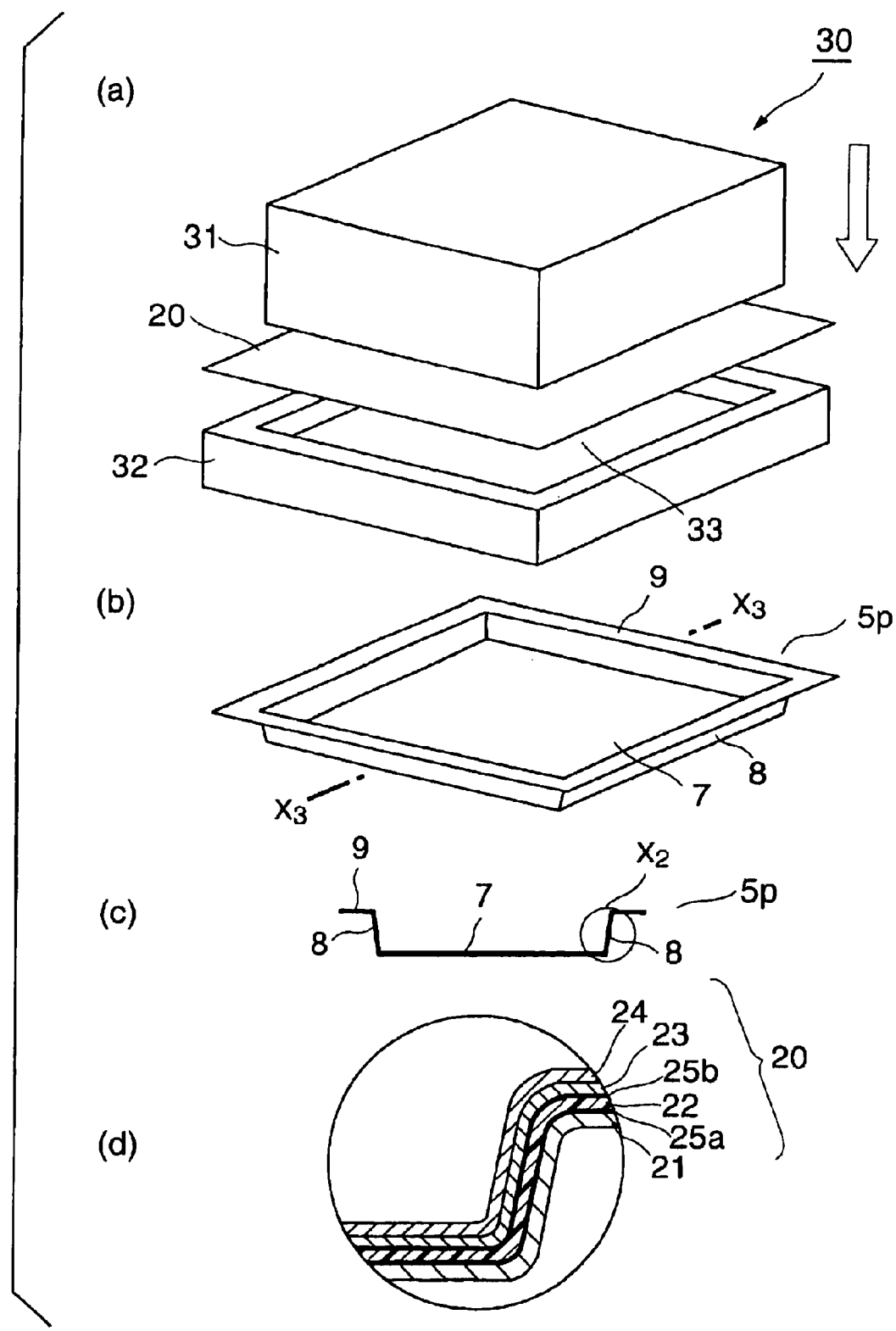
FIG. 5 is a view of assistance in explaining steps of a process for forming an embossed package.
Figure 7:
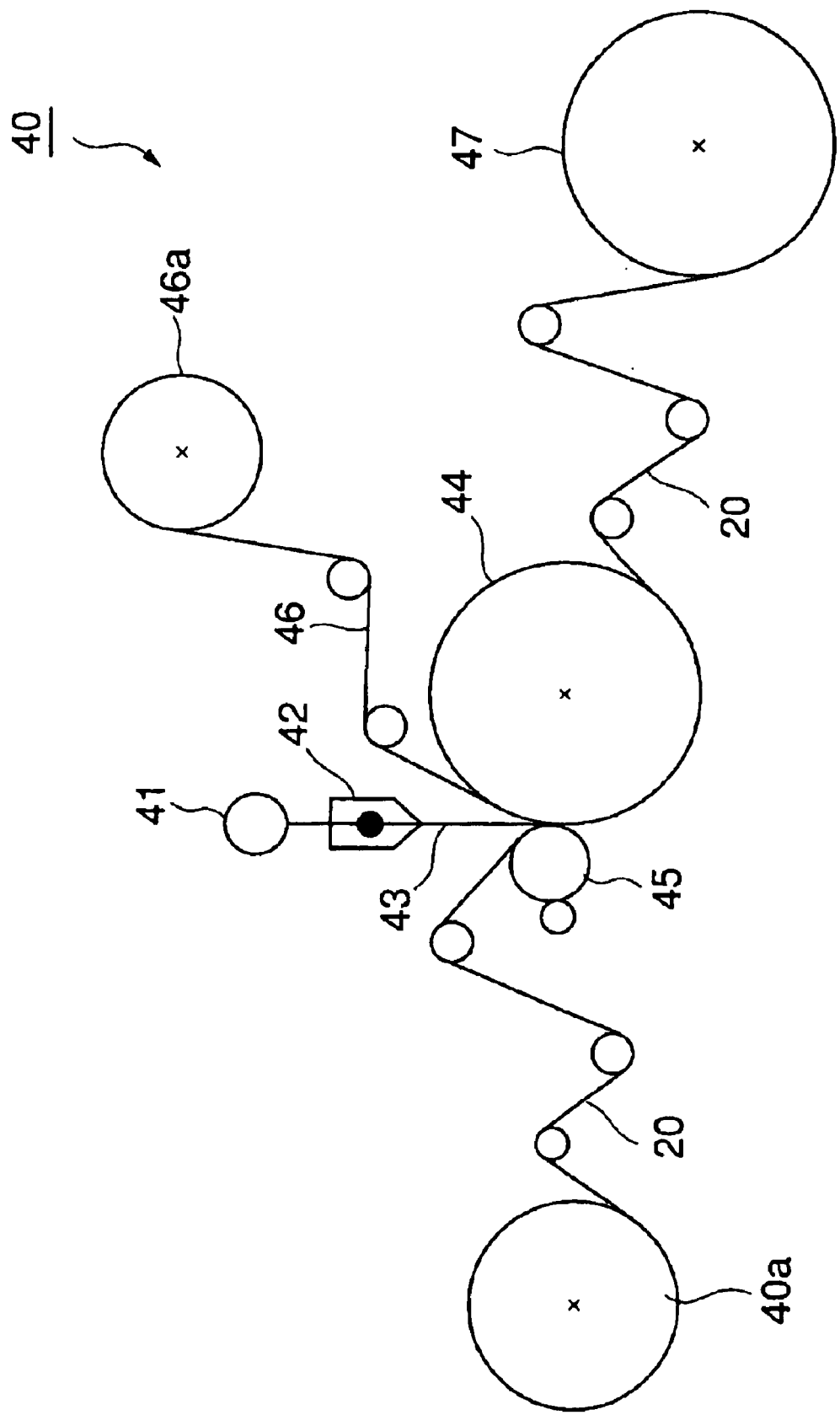
FIG. 7 is a skeleton view of a sandwich lamination system for manufacturing a laminated structure for forming a package for a polymer battery.
Figure 8:
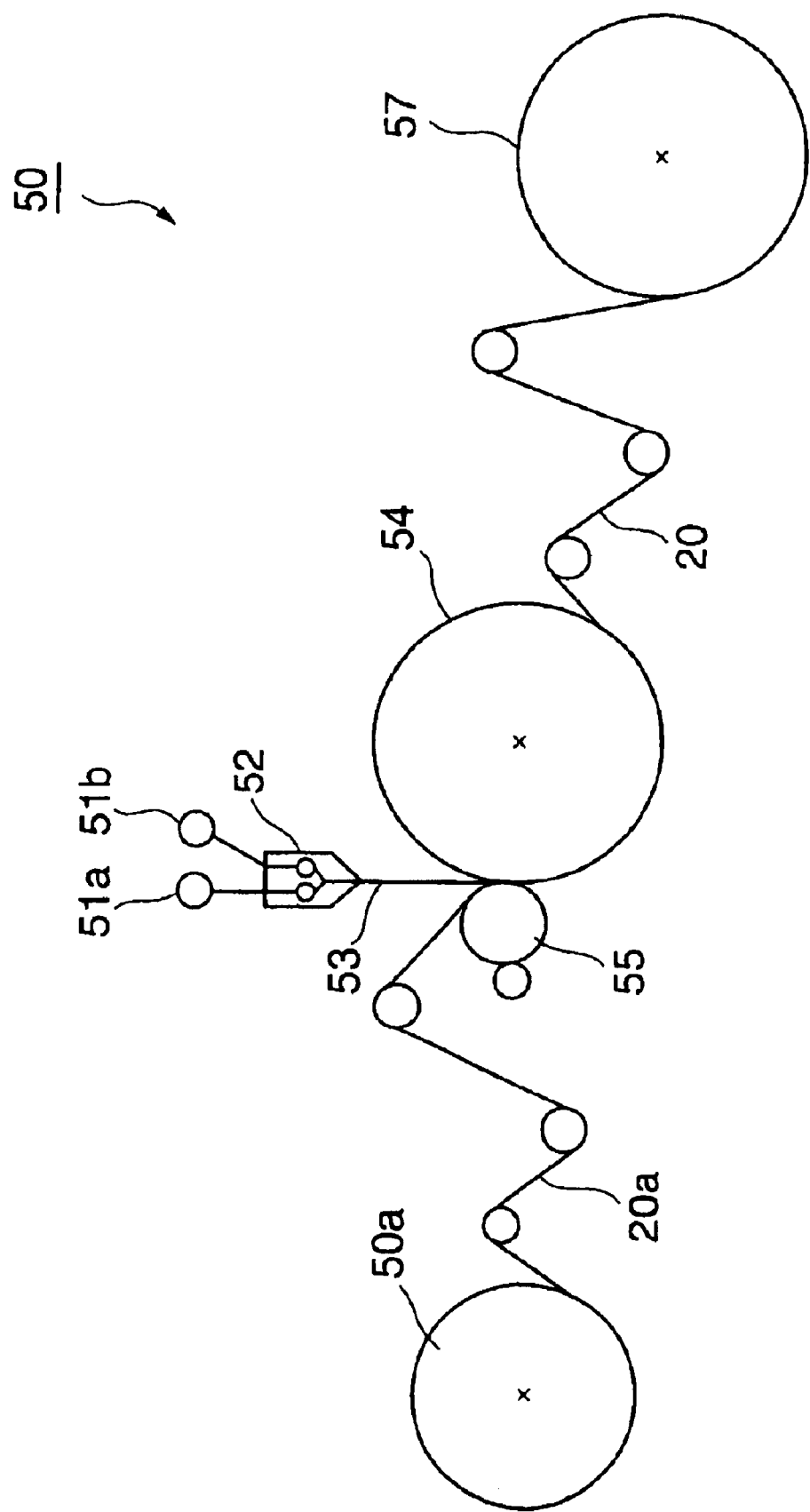
FIG. 8 is a skeleton view of a coextrusion system for manufacturing a laminated structure for forming a package for a polymer battery.

FIG. 2(a) is a perspective view of a polymer battery formed by sealing a polymer battery module in a package by using the sealing heads, FIG. 2(b) is a sectional view taken on line $X_1$—$X_1$ in FIG. 2(a), FIG. 2(c) is an enlarged view of a part $Y_1$ in FIG. 2(b), FIG. 3 is a perspective view of assistance in explaining a pouch package for a polymer battery, FIGS. 4(a) to 4(d) and 4(e) are perspective views and a sectional view, respectively, of assistance in explaining embossed packages for a polymer battery, FIG. 5(a) is a perspective view of assistance in explaining a method of forming an emboss package, FIG. 5(b) is a perspective view of an embossed package, FIG. 5(c) is a sectional view taken on line $X_3$—$X_3$ in FIG. 5(b) and FIG. 5(d) is an enlarged view of a part $Y_2$ in FIG. 5(c). FIGS. 6(a) to 6(d) are typical perspective views of laminated structures for forming a package for a polymer battery according to the present invention. FIG. 7 is a skeleton view of a sandwich lamination system for manufacturing a laminated structure for forming a package for a polymer battery. FIG. 8 is a skeleton view of a coextrusion system for manufacturing a laminated structure for forming a package for a polymer battery. FIGS. 9(a) to 9(e) are views of assistance in explaining a method of attaching an adhesive film to the tabs of a polymer battery module to bond the tabs to a package.

Figure 10:
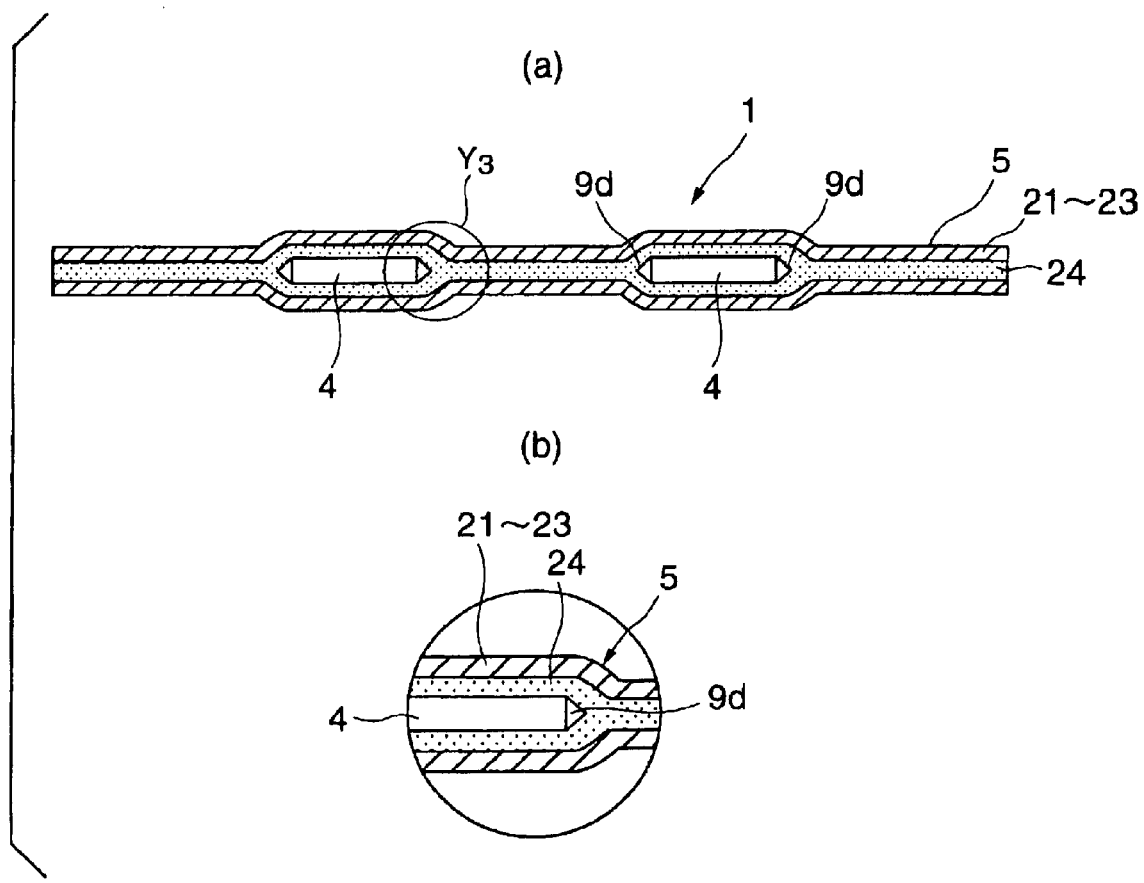
FIG. 10 is a view of a polymer battery manufactured by using a heat-sealing machine in a comparative example.

A polymer battery is fabricated by the following procedure. A pouch package having one open end, i.e., a package, for containing a polymer battery module is formed by processing a laminated structure having laminated construction of nylon layer/bonding layer/aluminum layer/bonding layer/poly-ethylene resin layer. The polymer battery module provided with tabs is put through the open end in the pouch so that the tabs extend through the open end. Then the open end is sealed by heat-sealing to complete a polymer battery. A conventional sealing heads for heat-sealing has flat sealing surfaces. When the open end is sealed with the sealing heads having flat sealing surfaces, gaps formed beside the opposite sides of tabs 4 projecting outside from a package 5 of a polymer battery 1 cannot be filled up with a resin of a heat-sealing resin layers 24 of a laminated structure forming the package 5 and unsealed gaps 9d (pinholes) are formed as shown in FIGS. 10(a) and 10(b) and hence the package 5 cannot be perfectly sealed. Heat-sealing conditions including temperature and pressure must be severely controlled to prevent the formation of such unsealed gaps 9d. Thus the conventional sealing heads have an aptitude for narrow application and it is difficult to carry out stable production.

As shown in FIGS. 10(a) and 10(b), the laminated structure forming the package 5 has, in addition to the heat-sealable resin layer 24, a base layer 21, a barrier layer 22 and an adhesive resin layer 23.

The inventors of the present invention made earnest studies to devise a method capable of stably heat-sealing an end part holding the tabs 4 of a package and have developed a heat-sealing machine 10 as shown in FIG. 1(a). The heat-sealing machine 10 is provided with a pair of sealing heads 10a and 10b respectively having sealing surfaces 12. Recesses 11 are formed in the sealing surfaces 12 of the sealing heads 10a and 10b. The recesses coincide with the tabs 4 lying in an end part of the package 5, respectively.

Although the recesses 11 are formed in the sealing surfaces 12 of both the sealing heads 10a and 10b shown in FIGS. 1(a) and 1(b), the recesses 11 may be formed only in the sealing surface 12 of one of the sealing heads 10a and 10b, for example, only in the sealing surface 12 of the sealing head 10a.

Dimensions of the pair of sealing heads 10a and 10b provided with the recesses 11 were determined through experiments. The depth m of the recesses 11 is in the range of ⅓ of the thickness of the tabs 4 to the thickness of the tabs 4, and the width n of the recesses 11 is in the range of the width of the tabs 4 plus 0.2 mm to the width of the tabs 4 plus 2.0 mm, preferably, in the range of the width of the tabs 4 plus 0.3 mm to the width of the tabs 4 plus 1.0 mm. Incidentally, in a common polymer battery 1, tabs 4 have a thickness in the range of about 50 to about 200 μm and a width in the range of about 5 to abut 20 mm.

The heat-sealing machine 10 provided with the sealing heads 10a and 10b is applied to fabricating a polymer battery 1 by sealing a polymer battery module 2 in a package 5, i.e., a pouch package, as shown in FIGS. 2 and 3, and to fabricating a polymer battery 1 by sealing a polymer battery module 2 in a package 5, i.e., an embossed package provided with a hollow part 7, as shown in FIG. 4 formed by pressing a packaging material. As shown in FIG. 3, the package (pouch) 5 has an unsealed end part 5a. The polymer battery module 2 is inserted through the unsealed end part 5a into the package 5, and the unsealed end part 5a is heat-sealed such that the tabs 4 are sandwiched between the walls of the package 5. The package 5 shown in FIG. 3 is formed by a pillow-type pouch package forming system. The package 5 may be formed by a three-sided seal pouch package forming system or a four-sided seal pouch forming system.

As shown in FIG. 4(d), the package (embossed package) 5 has a package body 5p provided with the hollow part 7, and a cover 5t. The polymer battery module 2 is placed in the hollow part 7 of the package body 5t, the cover 5t is put on the package body 5p, and peripheral parts of the package body 5p and the cover 5t are heat-sealed. A package 5 shown in FIG. 4(a) has an embossed package body 5p and a flat cover 5t. A package 5 shown in FIG. 4(b) has an embossed package body 5p and an embossed cover 5t, and has four sealed sides. A package 5 shown in FIG. 4(c) has a body 5b and an embossed cover 5t, and has three sealed sides. The package body 5p and the cover 5t are formed by processing a laminated structure, i.e., a packaging material, which will be described later.

Any suitable heat-sealing method may be used for forming the package 5, provided that the heat-sealing method is capable of melting and bonding together the innermost layers of the walls of the package 5. Possible heat-sealing methods includes a hot plate method using a hot plate heated by a heating fluid (water or oil) or a built-in heater, an electric impulse heat-sealing method, a radio-frequency heat-sealing method that applies a radio-frequency voltage to films and uses heat induced in the films, a ultrasonic sealing method using ultrasonic vibrations and a sealing method that heats the inner surfaces of films to be bonded together with flame or hot air and bonds the films together. A cooling device provided with cooling heads provided with recesses similar to the recesses 11 of the sealing heads 10a and 10b of the heat-sealing machine 10 may be used for cooling the heat-sealed parts of the package 5.

As shown in FIGS. 2 to 4, the polymer battery 1 includes the polymer battery module 2 and the package 5 containing the polymer battery module 2. The polymer battery module 2 consists of a cell unit (storage unit) 3 and tabs (electrodes) 4.

The cell unit 3 of the polymer battery module 2 includes a positive collector (aluminum or nickel), a positive electrode active layer (a metal oxide, carbon black, a metal sulfide, an electrolyte or a polymer, such as a polyacrylonitrile resin), an electrolytic layer (a carbonate electrolyte, such as propylene carbonate, ethylene carbonate, dimethyl carbonate or ethylene methyl carbonate), a negative electrode active layer (lithium, an alloy, carbon, an electrolyte or a polymer, such as polyacrylonitrile resin) and a negative collector (copper, nickel or a stainless steel).

The quality of a laminated structure for forming the package 5 of the polymer battery 1 will be explained.

A packaging material for forming the package 5 has, as essential components, a base layer, a barrier layer and an innermost layer. Chemical conversion coatings formed on the opposite surfaces of the barrier layer, respectively, feature the present invention.

The innermost layer may be formed by a dry lamination method, a hot lamination method, a sandwich lamination method or a coextrusion lamination method. A laminated structure formed by the aforesaid lamination method is subjected to postheating to enhance the bond strength of the barrier layer and the innermost layer and to prevent delamination that may be caused by the effect of hydrogen fluoride produced by the interaction between the electrolyte of the polymer battery module and moisture.

A polymer battery packaging material is used for forming the package 5 for packaging the polymer battery module 2. The package 5 is a pouch package as shown in FIGS. 2 and 3 or an embossed package as shown in FIG. 4. The pouch may be a three-sided seal pouch, a four-sided seal pouch or a pillow type pouch. FIGS. 2 and 3 show a pillow type package 5.

The package 5 shown in FIG. 4(a) is an embossed package having an embossed package body 5p provided with a hollow part 7, and a flat cover 5t and have four heat-sealed sides. A package 5 shown in FIG. 4(b) is an embossed package having an embossed package body 5p provided with a hollow part 7, and an embossed cover 5t provided with a hollow part 7, and having four heat-sealed sides. A package 5 shown in FIG. 4(c) is an embossed package having a body 5b and hollow parts 7 formed on the opposite sides of the body 5b, and having three heat-sealed sides.

When the package 5 has the hollow part 7 formed only in the package body 5p as shown in FIGS. 4(d) and 4(e), the package body 5p has side walls 8 forming the hollow part 7, and a flange 9 extending from the side walls 8, and a cover 5t.

As shown in FIGS. 5(a) to 5(d), the package body 5p of the package 5 is formed by inserting a laminated structure 20 in a space between a male die part 31 and a female die part 32 constituting a forming die 30 and pressing the laminated structure 20 between the male die part 31 and the female die part 32. The package body 50 thus formed has the hollow part 7 having the side walls 8 and the flange 9.

As shown in FIGS. 6(a) to 6(d), the laminated structure 20 forming the package 5 has, as essential components, a base layer 21, a first chemical conversion coating 25a, a barrier layer 22, a second chemical conversion coating 25b and an innermost layer 24. The innermost layer 24 is formed by a sandwich lamination method. The innermost layer 24 is an unoriented film of a polyethylene resin (hereinafter referred to as "PE resin") or a polypropylene resin. When forming the embossed package 5, the laminated structure 20 is required to be excellent in formability because the hollow part 7 for containing the polymer battery module 2 must be formed by embossing. Lamination of the component layers of the laminated structure 20 will be explained hereinafter.

The base layer 21 is an oriented film of a polyester resin or a nylon resin. Possible polyester resins are polyethylene terephthalate resins, polybutylene terephthalate resins, polyethylene naphthalate resins, polybutylene naphthalate resins, interpolyester resins and polycarbonate resins. Possible nylon resins are polyamide resins including nylon 6, nylon 66, copolymers of nylon 6 and nylon 66, nylon 610 and polymethaxylilene adipamide (MXD6).

When the polymer battery is used on a piece of hardware, the base layer 21 comes into direct contact with the piece of hardware. Therefore, it is basically desirable to form the base layer 21 of an intrinsically insulating resin. Since a film forming the base layer 21 has pinholes and pinholes will be formed in the film during processing, the thickness of the base layer 21 must be 6 µm or above, preferably, in the range of 12 to 25 µm.

The base layer 21 may be a laminated film in view of providing the base layer 21 with pinhole resistance and improved insulating ability.

A laminated film for the base layer 21 includes at least one resin layer consisting of two or more layers each having a thickness of 6 µm or above, preferably, in the range of 12 to 25 µm. The following laminated structures 1) to 7), not shown, are examples of the laminated base layer 21.
1) Oriented polyethylene terephthalate resin layer/ Unoriented nylon layer
2) Oriented nylon layer/oriented polyethylene terephthalate resin layer To improve the mechanical aptitude (stability when passed through processing machines and a packaging machine) and surface protecting ability (heat resistance and electrolyte resistance) of the packaging sheet and to reduce friction between a die and the base layer when forming the embossed package body, it is preferable that the base layer consists of plural layers and the surface of the base layer is coated with a fluorocarbon resin, an acrylic resin or a silicone resin. The base layer may be any one of the following laminated films.
3) Fluorocarbon resin layer/Oriented polyethylene terephthalate resin layer(the fluorocarbon resin layer may be a fluorocarbon resin film or a film formed by spreading a liquid fluorocarbon resin in a film and drying the same.)
4) Silicone resin layer/Oriented polyethylene terephthalate resin layer (the silicone resin layer may be a silicone resin film or a film formed by spreading a liquid silicone resin in a film and drying the same.)
5) Fluorocarbon resin layer/Oriented polyethylene terephthalate resin layer/Oriented nylon layer
6) Silicone resin layer/Oriented polyethylene terephthalate resin layer/oriented nylon layer
7) Acrylic resin layer/Oriented nylon layer (the acrylic resin layer may be an acrylic resin film or a film formed by spreading an acrylic resin and drying the same.)

The barrier layer 22 prevents the penetration of moisture into the polymer battery. To avoid the adverse effect of pinholes that may be formed in the barrier layer 22, to stabilize the workability (ease of fabricating pouches or embossing) and to provide the barrier layer 22 with pinhole resistance, the barrier layer 22 has a thickness of 15 µm or above and is formed from a metal foil, such as an aluminum foil or a nickel foil, or a film coated with an inorganic compound, such as silicon dioxide or alumina, by evaporation. Preferably, the barrier layer 22 is an aluminum foil of a thickness in the range of 20 to 80 µm.

The inventors of the present invention made studies to reduce pinholes and to prevent the cracking of an embossed package and decided to use aluminum having an iron content in the range of 0.3 to 9.0% by weight, preferably, 0.7 to 2.0% by weight for forming the barrier layer 22. Aluminum having such an iron content is more satisfactory in ductility than aluminum not containing any iron, the barrier layer 22 of aluminum having such an iron content is less subject to the formation of pinholes when the packaging laminated sheet is bent and is more capable of facilitating forming the side walls 8 of the embossed package 5 than a barrier layer of aluminum not containing any iron. A barrier layer of aluminum having an iron content less than 0.3% by weight is not satisfactorily pinhole-resistant and do not improve the formability of the packaging laminated structure. A barrier layer of aluminum having an iron content exceeding 9.0% by weight is unsatisfactory in flexibility and affect adversely to the workability of the packaging laminated structure in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated sheet. For example, to prevent the formation of creases or pinholes in making a package by an embossing process, a soft aluminum foil properly annealed according to the degree of forming may be used.

The inventors of the present invention found through studies that a satisfactory packaging laminated structure 20 can be formed by using an aluminum foil having opposite surfaces coated with chemical conversion coatings 25a and 25b formed by chemical conversion treatment as the barrier layer 12. The chemical conversion treatment forms an acid-resistant film of a phosphate, a chromate, a fluoride or a triazine thiol compound. Thus the separation of the barrier layer 22 of aluminum and the base layer 21 during an embossing process can be prevented, and the dissolution and corrosion of the surfaces of the barrier layer 22 of aluminum, particularly, aluminum oxide films coating the aluminum foil, by hydrogen fluoride produced by the interaction of the electrolyte of the polymer battery module and moisture can be prevented. The chemical conversion treatment improves the adhesive property (wettability) of the surface of the barrier layer 22 of aluminum, the separation of the base layer 21 and the barrier layer 22 can be prevented and the separation of the barrier layer 22 and the innermost layer due to the effect of hydrogen fluoride produced by the interaction between the electrolyte and moisture can be prevented by the chemical conversion treatment of the barrier layer 22 of aluminum.

It was found through experimental chemical conversion treatment using various substances that chemical conversion treatment method using a mixture of a phenolic resin, a trivalent chromium fluoride compound and phosphoric acid has satisfactory effect.

When the laminated structure 20 is intended for use for forming pouch packages, only one surface on the side of the innermost layer 24 of the barrier layer 22 needs to be processed by the chemical conversion treatment.

When both the surfaces of the barrier layer 22 are processed by the chemical conversion treatment, the separation of the barrier layer 22 and the base layer 21 can be prevented when processing the laminated structure 20 to form an embossed package. The laminated sheet 20 including the barrier layer 22 having both the surfaces processed by the chemical conversion treatment may be used for forming pouch packages.

Figure 6:
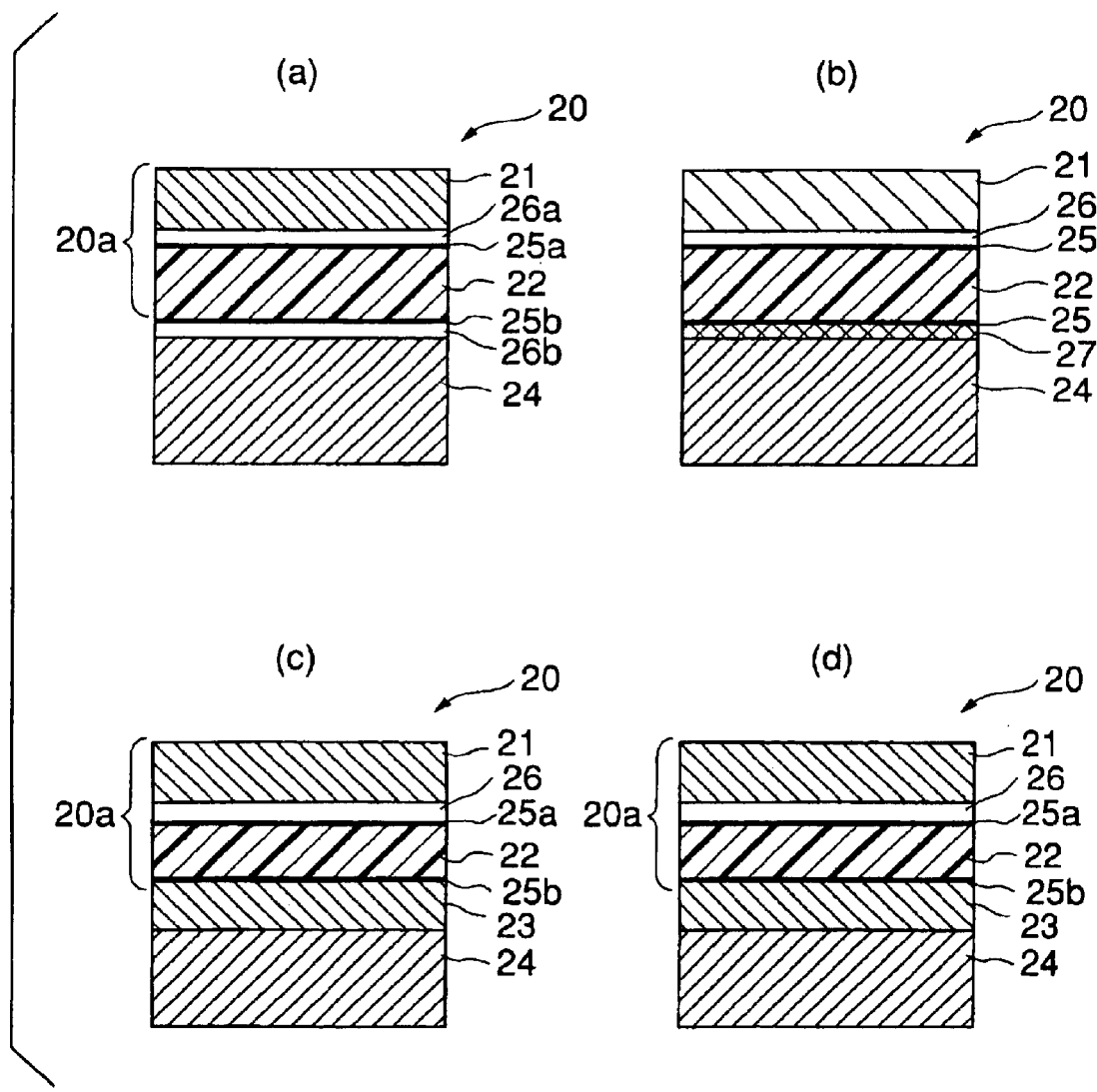
FIG. 6 is a sectional view of laminated structures for forming a package for a polymer battery.

When forming a laminated structure 20 shown in FIG. 6(a) by a battery packaging material forming method, a base laminated structure 20a of construction: base layer 21/first bonding layer 26a/first chemical conversion coating 25a/ barrier layer 22/second chemical conversion layer 25b is fabricated, and then an innermost layer 24 is bonded to the chemical conversion coating 25b of the base laminated structure 20a with a second bonding layer 26b by dry lamination.

When forming a laminated structure 20 shown in FIG. 6(b) by a battery packaging material forming method, a base laminated structure 20a similar to that shown in FIG. 6(a) is fabricated, and an acid-modified polyolefin resin layer 27 may be formed on the second chemical conversion coating 25b of the base laminated structure 20a, and then a polyolefin resin film may be laminated as an innermost layer 24 to the acid-modified polyolefin resin layer 27 by a hot lamination method.

When forming a laminated structure 20 shown in FIG. 6(c) by a battery packaging material forming method, a base laminated structure 20a similar to that shown in FIG. 6(a) is fabricated, and a polyolefin resin film as an innermost layer 24 may be laminated to the second chemical conversion coating 25b of the base laminated structure 20a by extruding an acid-modified polyolefin resin layer 23 on the second chemical conversion coating 25b by a sandwich lamination method. FIG. 7 shows a sandwich lamination system 40.

Referring to FIG. 7 showing the sandwich lamination system 40, a base laminated structure 20a is unwound from a base laminated structure roll 40a, and a polyolefin resin film 46 is unwound from a polyolefin resin film 46a. The base laminated structure 20a and the polyolefin resin film 46 are joined and pressed together between a chill roller 44 and a pressure roller 45, and a molten acid-modified polyolefin resin film 43 is extruded between the base laminated structure 20a and the polyolefin resin film 46 through a die 42 by an extruder 41 to form a laminated structure 20 by bonding together the base laminated structure 20a and the polyolefin resin film 46. The laminated structure 20 thus formed is rolled in a laminated structure roll 47.

When forming a laminated structure 20 shown in FIG. 6(d) by a battery packaging material forming method, a base laminated structure 20a similar to that shown in FIG. 6(a) is fabricated, and an adhesive resin layer 23 of an acid-modified polyolefin resin and an innermost resin layer 24 of a polyolefin resin may be laminated to the second chemical conversion coating 25b of the base laminated structure 20a by coextrusion. FIG. 8 shows a coextrusion lamination system 50.

Referring to FIG. 8 showing the coextrusion lamination system 50, a base laminated structure 20a is unwound from a base laminated structure roll 50a and, at the same time, a molten resin film 53 consisting of an acid-modified polyolefin resin and a polyolefin resin is extruded through a coextrusion die 52 by extruders 51a and 51b onto the base laminated structure 20a. The base laminated structure 20a and the molten resin film 53 are compressed and bonded together between a chill roller 54 and a pressure roller 55 to form a laminated structure 20. The laminated structure 20 is rolled in a laminated structure roll 57.

When the acid-modified polyolefin resin used as the adhesive resin or forming the adhesive resin film by the hot lamination method, the sandwich lamination method and the coextrusion lamination method to laminate the innermost layer 24 to the base laminated structure 20a is an acid-modified polypropylene resin, the innermost layer 24 is formed of a polypropylene resin, when the acid-modified polyolefin resin serving as the adhesive resin or forming the adhesive resin film is an acid-modified polyethylene resin, the innermost layer 24 is formed of a polyethylene resin.

In some cases, the acid-modified polyolefin resin is unable to adhere satisfactorily to the second chemical conversion coating 25b when laminating the innermost layer 24 to the second chemical conversion coating 25b to form the laminated structure 20. In such a case, an emulsion of the acid-modified polyolefin resin may be applied to the second chemical conversion coating 25b in an acid-modified polyolefin coating by a roll coating method or the like, the acid-modified polyolefin coating may be dried, if the acid-modified polyolefin resin is an acid-modified polypropylene, the acid-modified polyolefin coating may be baked at a temperature in the range of 170 to 200° C., and a polypropylene resin film for forming the innermost layer 24 may be laminated to the second chemical conversion coating 25b by sandwich lamination. However, a baking process for baking the acid-modified polyolefin coating takes a long time and productivity is reduced.

Earnest studies were made to develop a lamination method capable of laminating the innermost layer 24 to the chemical conversion coating 25b by a stable bond strength without requiring the application of the acid-modified polyolefin emulsion and the baking of the acid-modified polyolefin coating. It was found that a desired bond strength could be exhibited when the laminated structure 20 is heated after forming the same by laminating the innermost layer 24 to the second chemical conversion coating 25b of the base laminated structure 20a.

The laminated sheet 20 may be heated by any one of a contact heating method using a hot roller, a hot air heating method using hot air and an infrared heating method using near or far infrared rays, provided that the adhesive resin can be heated at a temperature not lower than the softening point thereof.

Another method of laminating the innermost layer 24 to the base laminated structure 20a heats the base laminated structure 20a such that the surface of the barrier layer 22 of aluminum to which the innermost layer 22 is to be bonded at a temperature equal to the softening point of the acid-modified polyolefin resin, and then the innermost layer 24 is laminated to the base laminated structure 20a by a sandwich lamination method or a coextrusion lamination method. The component layers of the laminated structure 20 thus formed are bonded together by stable bond strength.

The laminated structure 20 as a polymer battery packaging material may be provided, in addition to the base layer 21, the barrier layer 22 and the innermost layer 24, an intermediate layer between the barrier layer 22 and the innermost layer 24. The intermediate layer is added to the laminated structure 20 to enhances the strength of the polymer battery packaging material and to improve and stabilize the barrier property.

The surfaces of the component layers of the laminated structure 20 of the present invention may be processed by a surface activating treatment, such as a corona discharge treatment, a blasting treatment, an oxidation treatment or ozone treatment, to improve and stabilize film forming property, lamination property, formability (ease of forming pouches or embossed packages).

Figure 9:
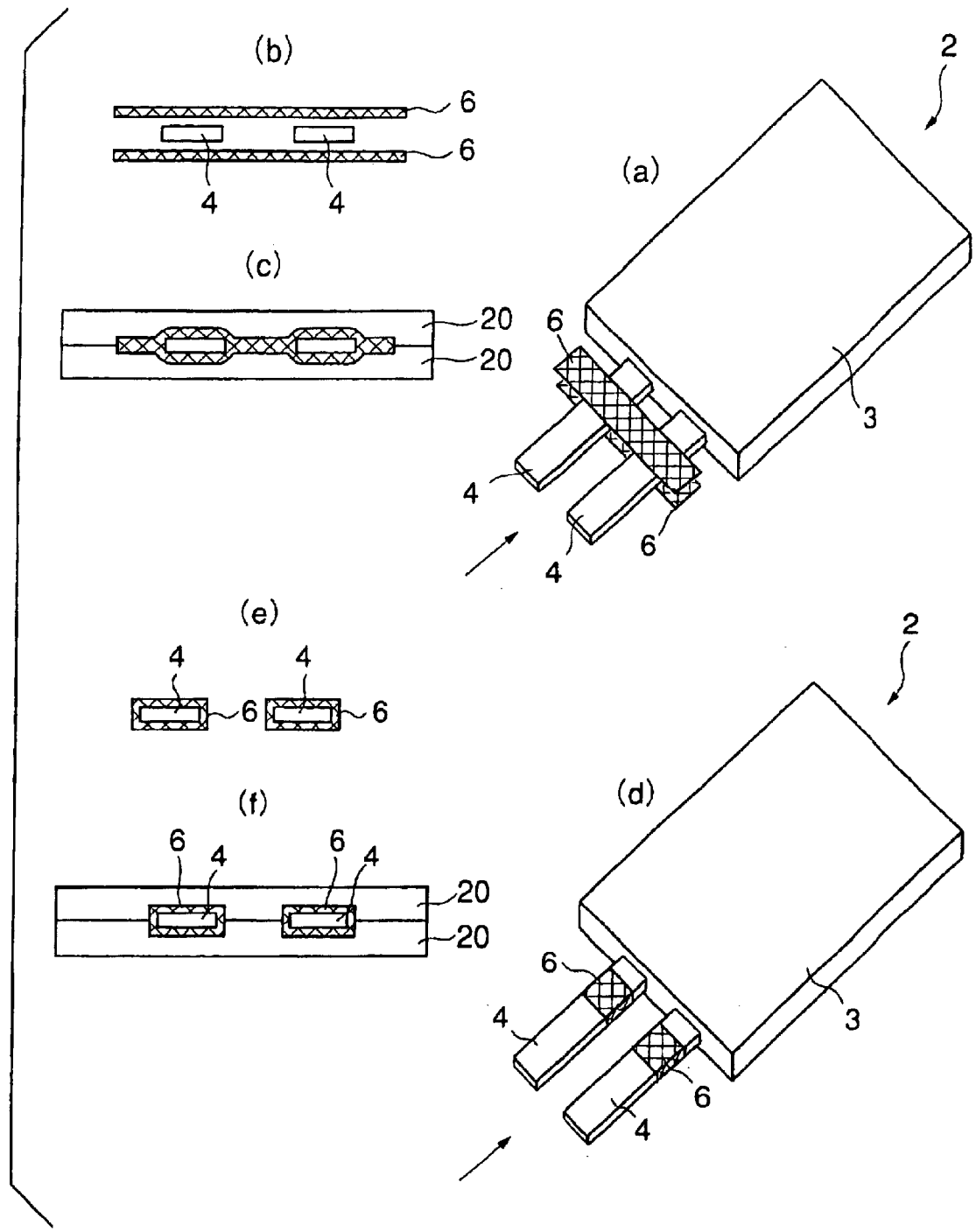
FIG. 9 is a view showing an adhesive film for bonding tabs of a polymer battery to a package.

If the innermost layer 24 of the laminated structure 20 cannot be bonded to a metal member by heat-sealing using the sealing heads, adhesive films 6 that can be bonded to both a metal member and the innermost layer 24 by heat-sealing are interposed between the tabs 4 and the innermost layers 24 of the laminated sheets 20 forming a package 5 as shown in FIGS. 9(a), 9(b) and 9(c) to ensure that gaps between the tabs 4 and the innermost layers 24 are sealed. The adhesive films 6 may be wound round predetermined parts of the tabs 4 as shown in FIGS. 9(d), 9(e) and 9(f).

The adhesive film 6 may be formed of an unsaturated carboxylic acid graft propylene resin, a metal-crosslinked polyethylene resin or a copolymer of ethylene or propylene, and an acrylic acid or a methacrylic acid.

Desirably, the base layer 21 and the first chemical conversion coating 25a formed on a surface of the barrier layer 22 on the side of the base layer 21 are bonded together by a dry lamination method.

The first bonding layer 26a for bonding together by dry lamination the base layer 21 and the first chemical conversion coating 25a formed by a chemical conversion treatment using chromium phosphate may be formed of any one of adhesives including polyester adhesives, polyethylene imine adhesives, polyether adhesives, cyanoacrylate adhesives, urethane adhesives, organic titanium adhesives, polyetherurethane adhesives, epoxy adhesives, polyester-urethane adhesives, imide adhesives, isocyanate adhesives, polyolefin adhesives and silicone adhesives.

EXAMPLES

Examples of the heat-sealing machine for packaging a polymer battery module and the heat-sealing method using the heat-sealing machine will be described.

Polymer Battery Module 2

The size of the cell unit 3 of a polymer battery module 2 is 30 mm×45 mm×3.0 mm.

The size of the tabs 4 of the polymer battery module 2 is 30 mm×6.0 mm×100 μm.

Package 5

The chemical conversion treatment for treating the barrier layer of the laminated structure used an aqueous solution of a phenolic resin, a trivalent chromium fluoride compound and phosphoric acid as a processing liquid. The processing liquid was applied to the surface of the barrier layer by a roll coating method in a film, and the film was baked at 180° C. or above. The weight per unit area of the film was 10 mg/m$^2$.

Pouch packages 5 are pillow type pouches having a size of 60 mm×50 mm. Embossed packages 5 includes package body provided with a hollow part of 30 mm×50 mm×3.5 mm.

Heat-sealing Device

A heat-sealing machine in an example used sealing heads 10a and 10b having A-type sealing surfaces 12 and those having B-type sealing surfaces 12. The A-type sealing surface 12 was provided with recesses 11 of 40 μm in depth m and 7.5 mm in length n, and the width W of the A-type sealing surface 12 corresponding to the width of a sealed fin was 5 mm. The B-type sealing surface 12 was provided with recesses 11 of 80 μm in depth m and 6.5 mm in length n, and the width W of the B-type sealing surface 12 corresponding to the width of a sealed fin was 5 mm.

A heat-sealing machine in a comparative example used sealing heads having flat sealing surfaces.

Heat-sealing Conditions (Tabs 4): 190° C., 5 s

Adhesive films 6 of an acid-modified polyolefin resin were placed on the opposite sides of the tabs in a part of the package to be sealed. The adhesive resin layers 23 and 27 were formed of a polypropylene resin having a melting point $T_{mpp} \pm 20°$ C. when the innermost layer 24 was formed of a polypropylene resin having a melting point $T_{mpp}$. The adhesive resin layers 23 and 27 were formed of an acid-modified polyethylene resin having a melting point $T_{mpe} \pm 30°$ C. when the innermost layer 24 was formed of a polyethylene resin having a melting point $T_{mpe}$.

Example 1 Pouch Package

One of the surfaces of a 20 μm thick aluminum foil 22 was subjected to chemical conversion treatment. A 12 μm thick oriented polyester film 21 was laminated to the other surface, i.e., the surface not processed by the chemical conversion treatment, of the aluminum foil 22 by a dry lamination method. A 30 μm thick film 24 of an LLDPE resin having a softening point of 115° C. and a melting point of 123° C. was laminated to the surface processed by the chemical conversion treatment of the aluminum foil 22 by dry lamination to complete a laminated structure 20. Sample pouch packages in Example 1 were formed by processing the laminated structure 20.

Example 2 Pouch Package

One of the surfaces of a 20 μm thick aluminum foil 22 was subjected to chemical conversion treatment. A 12 μm thick oriented polyester film 21 was laminated to the other surface, i.e., the surface not processed by the chemical conversion treatment, of the aluminum foil 22 by a dry lamination method. A 30 μm thick film 24 of a polypropylene resin having a softening point of 120° C. and a melting point of 154° C. was laminated to the surface processed by the chemical conversion treatment of the aluminum foil 22 by dry lamination to complete a laminated structure 20. Sample pouch packages in Example 2 were formed by processing the laminated structure 20.

Example 3 Pouch Package

Both the surfaces of a 20 μm thick aluminum foil 22 were subjected to chemical conversion treatment. A 12 μm thick oriented polyester film 21 was laminated to one of the surfaces of the aluminum foil 22 by a dry lamination method. A 20 μm thick adhesive resin layer 23 of an acid-modified polyethylene resin having a softening point of 90° C. and a melting point of 115° C. was formed by extrusion on the other surface processed by the chemical conversion treatment of the aluminum foil 22. A 30 μm thick LLDPE (linear low-density polyethylene) resin film 24 was bonded to the aluminum foil 22 by the adhesive resin layer 23 by a sandwich lamination method to form a laminated structure 20. The laminated structure 20 thus formed was heated so that the surface of the aluminum foil 22 was heated at 110° C. or above to complete the laminated structure 20. Sample pouch packages in Example 3 were formed by processing the laminated structure 20.

Example 4 Pouch Package

Both the surfaces of a 20 μm thick aluminum foil 22 were subjected to chemical conversion treatment. A 12 μm thick oriented polyester film 21 was laminated to one of the surfaces of the aluminum foil 22 by a dry lamination method. A 20 μm thick adhesive resin layer 23 of an acid-modified polypropylene resin having a softening point of 120° C. and a melting point of 147° C. was formed by extrusion on the other surface processed by the chemical conversion treatment of the aluminum foil 22. A 30 μm thick polypropylene resin film 24 was bonded to the aluminum foil 22 by the adhesive resin layer 23 by a sandwich lamination method to form a laminated structure 20. The laminated structure 20 thus formed was heated so that the surface of the aluminum foil 22 was heated at 110° C. or above to complete the laminated structure 20. Sample pouch packages in Example 4 were formed by processing the laminated structure 20.

Example 5 Pouch Package

Both the surfaces of a 20 μm thick aluminum foil 22 were subjected to chemical conversion treatment. A 16 μm thick oriented polyester film 21 was laminated to one of the surfaces of the aluminum foil 22 by a dry lamination method. A 30 μm thick adhesive resin layer 23 of an acid-modified polypropylene resin having a softening point of 123° C. and a melting point of 145° C. and a 30 μm thick innermost layer 24 of a polypropylene resin having a softening point of 120° C. and a melting point of 140° C. were formed by coextrusion on the other surface processed by the chemical conversion treatment of the aluminum foil 22 to form a laminated structure 20. The laminated structure 20 thus formed was heated so that the surface of the aluminum foil 22 was heated at 150° C. or above to complete the laminated structure 20. Sample pouch packages in Example 5 were formed by processing the laminated structure 20.

Example 6 Pouch Package

Both the surfaces of a 20 μm thick aluminum foil 22 were subjected to chemical conversion treatment. A 16 μm thick oriented polyester film 21 was laminated to one of the surfaces of the aluminum foil 22 by a dry lamination method. A 30 μm thick adhesive resin layer 23 of an acid-modified polyethylene resin having a softening point of 90° C. and a melting point of 115° C. and a 30 μm thick innermost layer 24 of an LLDPE resin having a softening point of 115° C. and a melting point of 123° C. were formed by coextrusion on the other surface processed by the chemical conversion treatment of the aluminum foil 22 to form a laminated structure 20. The laminated structure 20 thus formed was heated so that the surface of the aluminum foil 22 was heated at 120° C. or above to complete the laminated structure 20. Sample pouch packages in Example 6 were formed by processing the laminated structure 20.

Example 7 Embossed Package

Both the surfaces of a 40 μm thick aluminum foil 22 were subjected to chemical conversion treatment. A 25 μm thick oriented nylon film 21 was laminated to one of the surfaces of the aluminum foil by a dry lamination method. A 30 μm thick innermost layer 24 of a polypropylene resin having a softening point of 120° C. and a melting point of 147° C. was laminated to the other surface of the aluminum foil 22 by dry lamination to complete a laminated structure 20. Sample embossed packages in Example 7 were formed by processing the laminated structure 20.

Example 8 Embossed Package

Both the surfaces of a 40 μm thick aluminum foil were subjected to chemical conversion treatment. A 25 μm thick oriented nylon film 21 was laminated to one of the surfaces of the aluminum foil 21 by a dry lamination method. A 30 μm thick innermost layer 24 of an LLDPE resin having a softening point of 115° C. and a melting point of 123° C. was laminated to the other surface of the aluminum foil 22 by dry lamination to form a laminated structure 20. Sample embossed packages in Example 8 were formed by processing the laminated structure 20.

Example 9 Embossed Package

Both the surfaces of a 40 μm thick aluminum foil 22 were subjected to chemical conversion treatment. A 25 μm thick oriented nylon film 21 was laminated to one of the surfaces of the aluminum foil 22 by dry lamination. An adhesive resin layer 27 of an acid-modified polypropylene resin having a softening point of 110° C. and a melting point of 137° C. was formed on the other surface processed by the chemical conversion treatment of the aluminum foil 22 in a unit weight of 3 g/m². A 30 μm thick innermost layer 24 of a polypropylene resin having a softening point of 127° C. and a melting point of 142° C. was laminated to the aluminum foil 22 with the adhesive resin layer 27 by hot lamination to form a laminated structure 20. Sample embossed packages in Example 9 were formed by processing the laminated structure 20.

Example 10 Embossed Package

Both the surfaces of a 40 μm thick aluminum foil 22 were subjected to a chemical conversion treatment. A laminated film 21 consisting of a 6 μm thick oriented polyester film and a 15 μm thick oriented nylon film was laminated to one of the surfaces of the aluminum foil 22 by dry lamination with the with the oriented nylon film bonded to the surface processed by the chemical conversion treatment of the aluminum foil 22. An adhesive resin layer 27 of an acid-modified polypropylene resin having a softening point of 110° C. and a melting point of 137° C. were formed in a unit weight of 3 g/m² on the other surface processed by the chemical conversion treatment of the aluminum foil 22. A 30 μm thick innermost layer 24 of a polypropylene resin having a softening point of 127° C. and a melting point of 142° C. was laminated to the other surface of the aluminum foil 22 by the adhesive resin layer 27 by hot lamination to form a laminated structure 20. Sample embossed packages in Example 10 were formed by processing the laminated structure 20.

Example 11 Embossed Package

Both the surfaces of a 40 μm thick aluminum foil were subjected to chemical conversion treatment. A 25 μm thick oriented nylon film 21 was laminated to one of the surfaces of the aluminum foil 21 by a dry lamination method. A 20 μm adhesive resin layer 23 of an acid-modified polyethylene resin having a softening point of 90° C. and a melting point of 115° C. was extruded on the other surface processed by the chemical conversion treatment. A 30 μm thick innermost layer 24 of an LLDPE resin was laminated to the other surface of the aluminum foil 22 by sandwich lamination to form a laminated structure 20. The laminated structure 20 was heated so that the surface of the aluminum foil 22 was heated at 110° C. or above. Sample embossed packages in Example 11 were formed by processing the laminated structure 20.

Example 12 Embossed Package

Both the surfaces of a 40 μm thick aluminum foil 22 were subjected to chemical conversion treatment. A 25 μm thick oriented nylon film 21 was laminated to one of the surfaces of the aluminum foil by a dry lamination method. A 20 μm thick adhesive resin layer 23 of an acid-modified polypropylene resin having a softening point of 120° C. and a melting point of 147° C. was extruded on the other surface processed by the chemical conversion treatment of the aluminum foil 22. A 30 μm thick innermost layer 24 of a polypropylene resin was laminated to the other surface of the aluminum foil 22 by sandwich lamination to form a laminated structure 20. The laminated structure 20 was heated so that the surface of the aluminum foil 22 was heated at 110° C. or above. Sample embossed packages in Example 12 were formed by processing the laminated structure 20.

Example 13 Embossed Package

Both the surfaces of a 50 μm thick aluminum foil 22 were subjected to chemical conversion treatment. A 25 μm thick oriented nylon film 21 was laminated to one of the surfaces of the aluminum foil by a dry lamination method. A 20 μm thick adhesive resin layer 23 of an acid-modified polyethylene resin having a softening point of 120° C. and a melting point of 130° C. and a 30 μm thick innermost layer 24 of a high-density polyethylene resin having a softening point of 125° C. and a melting point of 132° C. were formed by coextrusion on the other surface processed by the chemical conversion treatment of the aluminum foil 22 to form a laminated structure 20. The laminated structure 20 thus formed was heated so that the surface of the aluminum foil 22 was heated at 140° C. or above to complete the laminated structure 20. Sample embossed packages in Example 13 were formed by processing the laminated structure 20.

Example 14 Embossed Package

Both the surfaces of a 50 μm thick aluminum foil 22 were subjected to chemical conversion treatment. A 25 μm thick oriented nylon film 21 was laminated to one of the surfaces of the aluminum foil by a dry lamination method. A 30 μm thick adhesive resin layer 23 of an acid-modified polyethylene resin having a softening point of 123° C. and a melting point of 145° C. and a 30 μm thick innermost layer 24 of a polypropylene resin having a softening point of 120° C. and a melting point of 140° C. were formed by coextrusion on the other surface processed by the chemical conversion treatment of the aluminum foil 22 to form a laminated structure 20. The laminated structure 20 thus formed was heated so that the surface of the aluminum foil 22 was heated at 140° C. or above to complete the laminated structure 20. Sample embossed packages in Example 14 were formed by processing the laminated structure 20.

Comparative Examples 1 to 14

Sample pouch packages and sample embossed packages in Comparative examples 1 to 14 were made by heat-sealing pouches and embossed packages formed by processing the laminated structures 20 from which the sample pouch packages and sample embossed packages in Examples 1 to 14 were made by a heat-sealing machine provided with sealing heads having flat sealing surfaces.

Comparative Example 15 Pouch Package

One of the surfaces of a 20 μm thick aluminum foil was subjected to chemical conversion treatment. A 16 μm thick oriented polyester film was laminated to the surface processed by the chemical conversion treatment of the aluminum foil by a dry lamination method. A 20 μm thick molten resin film of an acid-modified polyethylene resin having a softening point of 90° C. and a melting point of 115° C. for forming a bonding resin layer was extruded onto the surface not processed by the chemical conversion treatment of the aluminum foil. A 30 μm thick LLDPE resin film was formed by sandwich lamination to form a laminated structure. Sample pouch packages in Comparative example 15 were formed by processing the laminated structure.

Comparative Example 16 Pouch Package

Both the surfaces of a 40 μm thick aluminum foil were subjected to chemical conversion treatment. A 25 μm thick oriented nylon film was laminated to one of the surfaces of the aluminum foil by a dry lamination method. A 30 μm thick molten resin film of an acid-modified polypropylene resin having a softening point of 120° C. and a melting point of 147° C. was laminated to the aluminum foil by dray lamination to form a laminated structure. Sample pouch packages in Comparative example 16 were formed by processing the laminated structure.

Method of Evaluation

A seal testing liquid was injected into the sample packages 5, i.e., sample pouch pacakges and sample embossed packages, and the sample packages 5 were suspended with the tabs 4 extended downward. The sample packages 5 were inspected for the infiltration of the seal testing liquid through sealed parts of the packages 5 beside the tabs 4.

1) Sealing Performance

Sealed parts of the sample packages 5 beside the tabs 4 were inspected visually for the infiltration of the seal testing liquid through the sealed parts beside the tabs 4 after suspending the sample packages 5 containing the seal testing liquid with the tabs 4 extended downward for twenty-four hours.

2) Chemical Resistance Test

An electrolyte were injected into the sample packages 5, the sample packages 5 containing the electrolyte were kept in an atmosphere of 60° C. and 90% RH in a thermostat for seven days, the electrolyte were drained off the sample packages 5, the seal testing liquid was injected into the sample packages 5 and the sample packages 5 were kept for twenty-four hours. The sample packages 5 were inspected visually for the infiltration of the seal test liquid through the sealed parts beside the tabs 4.

3) Delamination

Samples were inspected for the separation of the innermost layer 24 and the aluminum foil 22, the separation of the aluminum foil 22 and the adhesive resin layer 23 or the separation of the aluminum foil 22 and the adhesive resin layer 27.

Results

All the 100 sample packages in each of Examples 1 to 14 heat-sealed by using the sealing heads provided with the A-type and the B-type sealing surfaces were perfect in sealing performance, the infiltration of the seal testing liquid through the parts beside the tabs 4 did not occur therein, the chemical resistance thereof was satisfactory, and none of those packages were delaminated. In the majority of the sample packages in Comparative examples 1 to 14, the seal testing liquid permeated half the width of the sealed parts and there was the possibility that the seal testing liquid infiltrates through the sealed parts. Chemical resistance tests showed that infiltration of the seal testing liquid occurred in two or three sample packages out of 100 sample packages in each of comparative examples 1, 3 and 11 and there was the possibility with the rest of the sample packages that the sealed parts are unsealed accidentally and the laminated structures forming the packages are delaminated due to the corrosion of the tabs by hydrogen fluoride produce by interaction between the electrolyte of the polymer battery module and moisture.

Separation of the aluminum foil and the innermost layer occurred in all the 100 sample packages in each of Comparative examples 15 and 16.

The sealed parts of the packages beside the tabs sealed by using the sealing heads according to the present invention were stable and the packages according to the present invention exhibited improved sealing performance. Postheating improved the bond strength of the laminated structure and was effective in preventing delamination due to the adverse effect of hydrogen fluoride produced by the interaction of the electrolyte of the polymer battery module and moisture.

Second Embodiment

A second embodiment of the present invention will be described with reference to the accompanying drawings.

FIGS. 11 to 16 show the second embodiment of the present invention.

A polymer battery and a package for the polymer battery will be described with reference to FIGS. 14 and 15.

Figure 14:
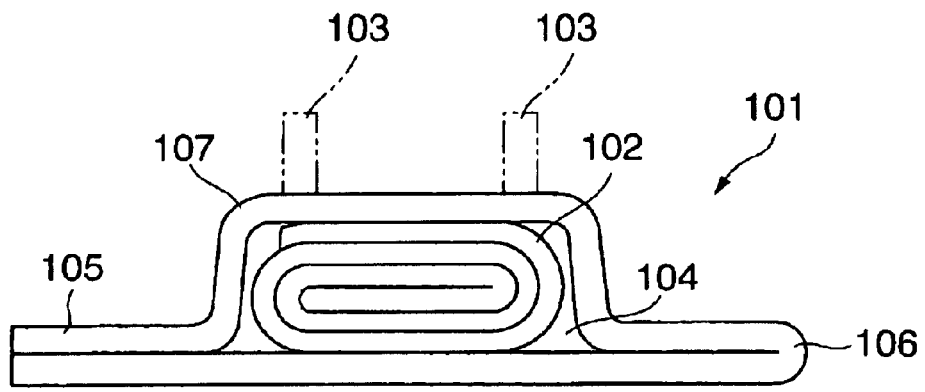
FIG. 14 is a view of a packaged polymer battery.
Figure 15:
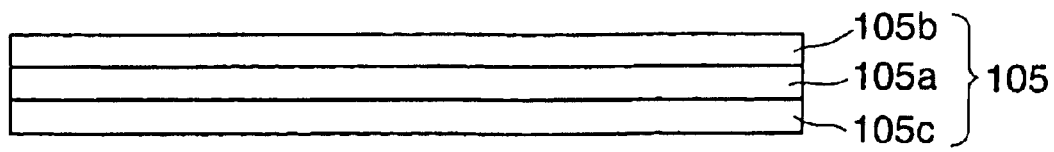
FIG. 15 is a view showing the structure of a package.

Referring to FIG. 14, a polymer battery 101 includes an embossed packaging sheet (package) 105 provided with an embossed hollow part 107, an electrode assembly (polymer battery module) 102 placed in the embossed hollow part 107, and an electrolyte 104 filling up the embossed hollow part 107. A pair of tabs 103 connected to the electrode assembly (polymer battery module) 102 project outside from the embossed packaging sheet 105. The embossed packaging sheet 105 shown in FIG. 14 corresponds to the package 5 shown in FIG. 3.

The embossed hollow part 107 of the embossed packaging sheet 105 is formed beforehand. The electrode assembly 102 and the electrolyte 104 are put in the embossed hollow part 107, the embossed packaging sheet 105 is folded along a fold 106, and the superposed parts of the embossed packaging sheet 105 are bonded together to complete the polymer battery 101.

The embossed packaging sheet 105 consists of an aluminum layer 105a, a base layer 105b bonded to one of the surfaces of the aluminum layer 105a, and a heat-sealable layer 105c bonded to the other surface of the aluminum layer 105a. The base layer 105b is formed of nylon or a polyethylene terephthalate resin (PET resin). The heat-sealable layer 105c is formed of a polypropylene resin (PP resin) or a polyethylene resin (PE resin).

The embossed packaging sheet 105 is folded along the fold 106 so that the heat-sealable layers of the superposed parts thereof are contiguous with each other.

Figure 11:
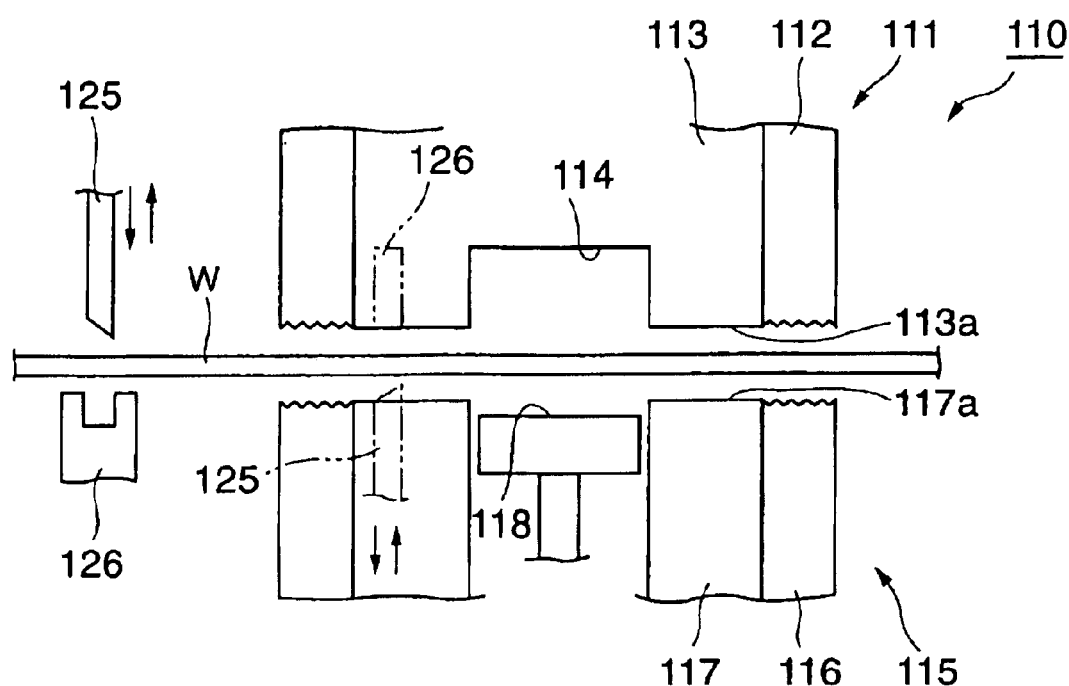
FIG. 11 is a view of an embossing apparatus for carrying out an embossing method according to the present invention.
Figure 12:
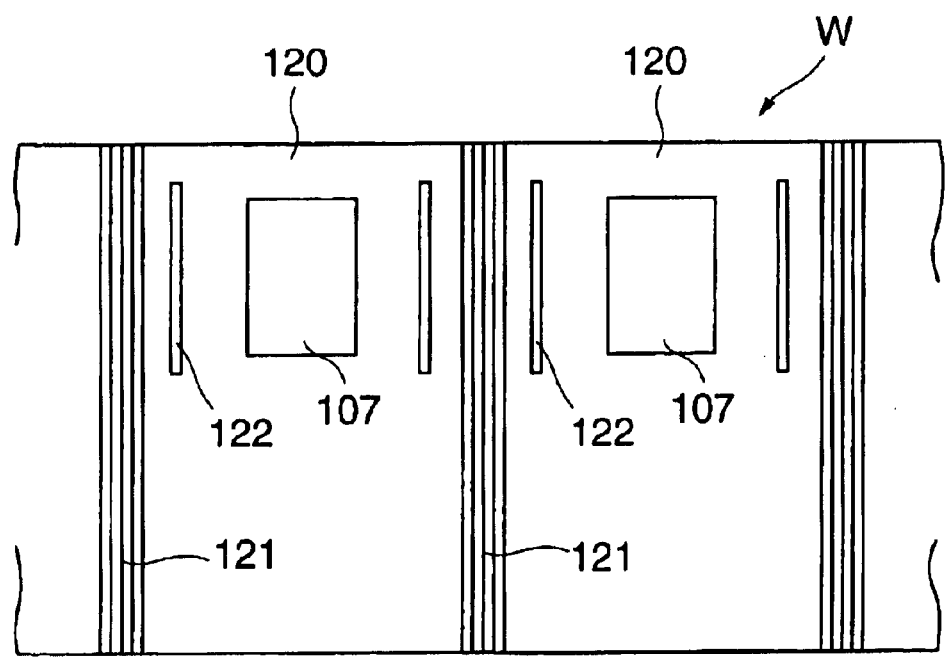
FIG. 12 is a view of a workpiece provided with cuts having the shape of a slit.

An embossing machine 110 for forming the embossed packaging sheet 105 will be described with reference to FIG. 11. A workpiece W for forming embossed packaging sheets 105 will be described. The workpiece W is the same as the embossed packaging sheet 105 in construction and has a plurality of sections (package section) 120 for forming a plurality of embossed packaging sheet 105 as shown in FIG. 12.

The embossing machine 110 is provided with a male die part 115 and a female die part 111. The male die part 115 and the female die part 111 cooperate to emboss a workpiece W.

The male die part 115 has male corrugated parts 116 corresponding to the side parts of the sections 120 of the workpiece W, and a male pressing part 117 extending between the male corrugated parts 116. The male pressing part 117 has a pressing surface 117a to press the workpiece W. A forming die part 118 is fitted in an opening formed in the male pressing part 117. The forming die part 118 can be moved in opposite directions in the opening of the male pressing part 117.

The female die part 111 has female corrugated parts 112 corresponding to the male corrugated parts 116, and a female pressing part 113 extending between the female corrugated parts 112 and corresponding to the male pressing part 117. The female pressing part 113 has a pressing surface 113a. The workpiece W is held between the male pressing part 117 and the female pressing part 113 and is compressed between the pressing surface 117a of the male pressing part 117 and the pressing surface 113a of the female pressing part 113.

The female die part 111 is provided with a forming recess 114. The forming die part 118 goes into the forming recess 114.

An embossing method to be carried out by the embossing machine 110 will be described. A workpiece W formed by sandwiching an aluminum layer 105a between a base layer 105b and a heat-sealable layer 105c is prepared. The workpiece W has a plurality of sections (package section) 120 respectively for forming a plurality of embossed packaging sheets 105. Corrugations 121 are formed in boundary parts between the sections 120 of the workpiece W with the male corrugating parts 116 and the female corrugated parts 122.

A pair of elongate cuts 122 are formed in a part of each section 120 of the workpiece W corresponding to the male pressing part 117 and the female pressing part 113. The elongate cuts 122 are formed by a cutter including a cutting blade 125 and a cutting block 126 disposed on the upstream side of the embossing machine 110 having the male die part 115 and the female die part 111. The part of the section 120 corresponding to the male pressing part 117 and the female pressing part 113 includes all the parts of the section 120 excluding a part of the section 120 for forming the embossed hollow part 107. The cutter maybe incorporated into the embossing die instead of providing the same on the upstream side of the embossing die; the cutting block 126 may be combined with the male pressing part 117, and the cutting blade 125 may be combined with the female pressing part 113.

When embossing the workpiece W, the forming die part 118 tends to draw the workpiece W into the forming recess 114. The pair of elongate cuts 122 are extended perpendicularly to directions in which the workpiece W is drawn. The opposite end parts of the pair of elongate cuts 122 extend beyond the opposite ends of a part of the section 120 corresponding to the forming recess 114, respectively, as shown in FIG. 12. The elongate cuts 122 may be curved slits 122 as shown in FIG. 13.

Figure 13:
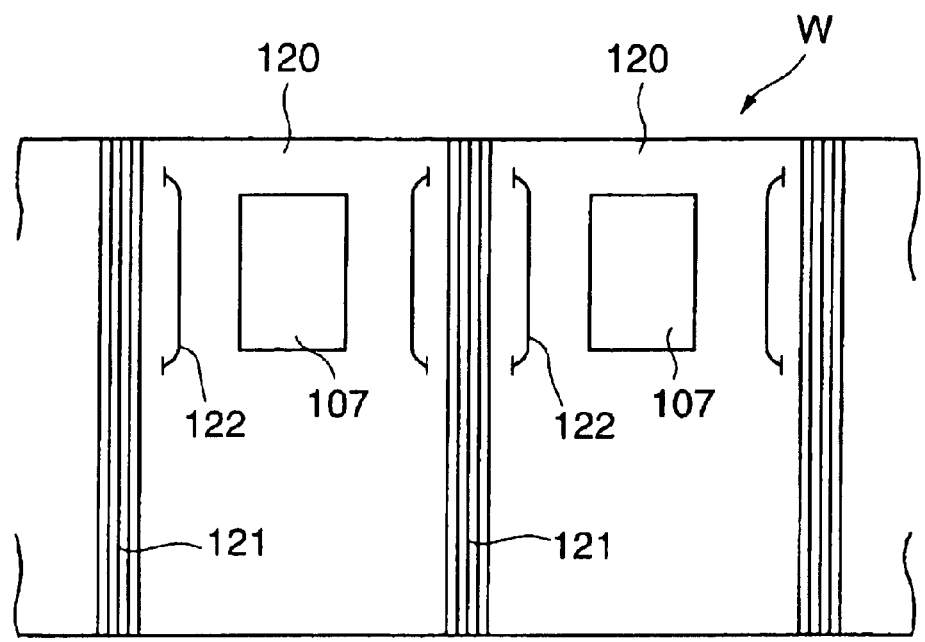
FIG. 13 is a view of a workpiece provided with cuts having the shape of a curved slit.

The pair of cuts 122 may be formed in parallel to the ridges of the corrugations 121 formed in the workpiece W as shown in FIGS. 12 and 13, one cut 122 may be formed perpendicularly to the ridges of the corrugations 121 as shown in FIG. 16(a) or one cut 122 may be formed in parallel to the ridges of the corrugations 121 and another cut 122 may be formed perpendicularly to the ridges of the corrugations 121 as shown in FIG. 16(b).

The workpiece W is fed into a space between the male die part 115 and the female die part 111. Then the male die part 115 and the female die part 111 are moved toward the workpiece W to hold the workpiece W between the male corrugated parts 116 of the male die part 115 and the female corrugated parts 112 of the female die part 111 and to compress the same lightly between the respective pressing surfaces 117a and 113a of the male pressing part 117 and the female pressing part 113. The male corrugated parts 116 and the female corrugated parts 112 hold firmly boundary parts between the adjacent sections 120 of the workpiece W so that an embossing cycle for embossing one of the sections 120 may not affect the section 120 adjacent to the section 120 being subjected to embossing. Therefore, an embossed hollow part 107 formed in the preceding section 120 of the workpiece W is not deformed when the succeeding section 120 is subjected to embossing. By holding the workpiece between the male corrugated parts 116 and the female corrugated parts 112, the corrugations 121 in boundary parts are formed between the adjacent sections 120 of the workpiece W.

Subsequently, the forming die part 118 of the male die part 115 is advanced into the forming recess 114 of the female die part 111 for embossing. Consequently, a part of the section 120 of the workpiece W is embossed to form an embossed hollow part 107. The section 120 of the workpiece W is compressed lightly between the respective pressing surfaces 117a and 113a of the male pressing part 117 and the female pressing part 113 during embossing. Since the pair of cuts 122 are formed in the section 120 of the workpiece W, a part of the section 120 between the cuts 122 is drawn smoothly into the forming recess 114. That is, although the section 120 is held between the male corrugated parts 116 and the female corrugated parts 112, the part of the section 120 between the cuts 122 are relatively free to move, and hence the part of the section 120 between the cuts 122 is movable. Accordingly, the section 120 of the workpiece W can be easily and accurately embossed and the embossed hollow part 107 can be accurately formed in the section 120 of the workpiece W. After the embossed hollow parts 107 have been thus formed in the sections 120 of the workpiece W, each section 120 is cut along cutting lines on the inner side of the pair of cuts 122 to divide the workpiece W into individual embossed packaging sheets 105.

As apparent form the foregoing description, the sections 120 of the workpiece W can be accurately embossed to form the embossed hollow parts 107 accurately. Since the part of each section 120 corresponding to the male pressing part and the female pressing part is provided with the cuts, a part of the section between the cuts can be smoothly drawn into the forming recess, so that the embossed hollow part can be accurately formed in the workpiece.

Third Embodiment

A third embodiment of the present invention will be described with reference to the accompanying drawings.

Figure 17:
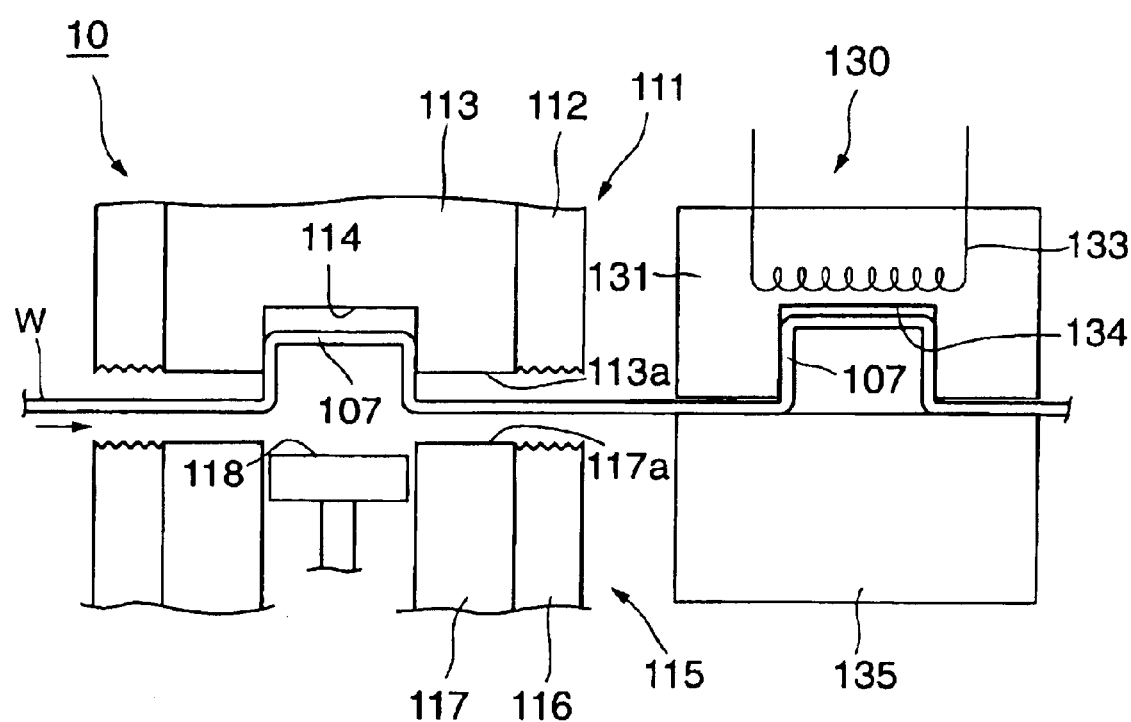
FIG. 17 is a view of a workpiece pressing machine according to the present invention.

Referring to FIG. 17 showing the third embodiment of the present invention, an embossing machine 110 is provided with a male die part 115 and a female die part 111. The male die part 115 and the female die part 111 cooperate to emboss a workpiece W.

Figure 16:
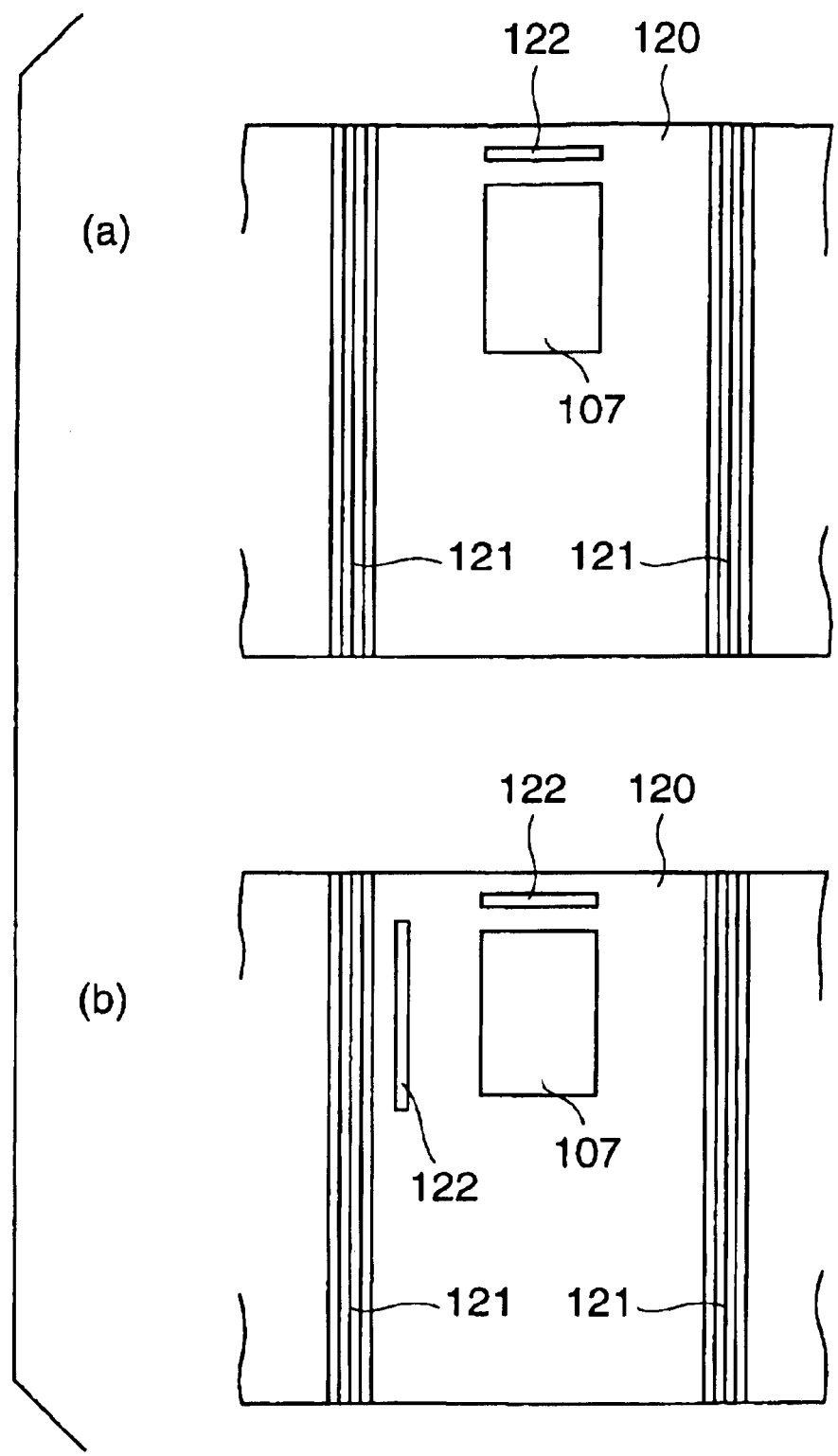
FIG. 16 is a view of workpieces provided with cuts in a modification.

The male die part 115 has male corrugated parts 116 corresponding to the side parts of the sections 120 of the workpieces W shown in FIGS. 12, 13 and 16, and a male pressing part 117 extending between the male corrugated parts 116. The male pressing part 117 has a pressing surface 117a to press the workpiece W. A forming die part 118 is fitted in an opening formed in the male pressing part 117. The forming die part 118 can be moved in opposite directions in the opening of the male pressing part 117.

The female die part 111 has female corrugated parts 112 corresponding to the male corrugated parts 116, and a female pressing part 113 extending between the female corrugated parts 112 and corresponding to the male pressing part 117. The female pressing part 113 has a female pressing surface 113a. The workpiece W is held between the male pressing part 117 and the female pressing part 113 and is compressed between the male pressing surface 117a of the male pressing part 117 and the female pressing surface 113a of the female pressing part 113.

The female die part 111 is provided with a forming recess 114. The forming die part 118 goes into the forming recess 114.

A work pressing machine 130 is disposed on the downstream of the embossing machine 110. The work pressing machine 130 compresses the workpiece W excluding an embossed hollow part 107 formed by the embossing machine 110.

The work pressing machine 130 is provided with a first die part 131 provided with a recess 134 capable of receiving the embossed hollow part 107 of the workpiece W and disposed above the workpiece W, and a second die part 135 disposed below the workpiece W to compress the workpiece W in cooperation with the first die part 131.

A heater 133 is embedded in the first die part 131 to heat the entire first die part 131. The first die part 131 may be heated by ultrasonic heating or high-frequency heating instead of being heated by the heater 133.

The operation of the third embodiment will be described. A workpiece W formed by sandwiching an aluminum layer 105a between a base layer 105b and a heat-sealable layer 105c is prepared. The workpiece W has a plurality of sections (package sections) 120 respectively for forming a plurality of embossed packaging sheets 105. Corrugations 121 are formed in boundary parts between the sections 120 of the workpiece W with the male corrugating parts 116 and the female corrugated parts 112.

A pair of cuts 122 are formed in a part of each section 120 of the workpiece W corresponding to the male pressing part 117 and the female pressing part 113. The cuts 122 are formed by a cutter, not shown, before the section 120 is fed into the embossing machine 110. The part of the section 120 corresponding to the male pressing part 117 and the female pressing part 113 includes all the parts of the section 120 excluding a part of the section 120 for forming the embossed hollow part 107.

When embossing the workpiece W, the forming die part 118 tends to draw the workpiece W into the forming recess 114. The pair of cuts 122 are extended perpendicularly to directions in which the workpiece W is drawn. The opposite end parts of the pair of cuts 122 extend beyond the opposite ends of a part of the section 120 corresponding to the forming recess 114, respectively, as shown in FIG. 12. The cuts 122 may be curved slits 122 as shown in FIG. 13.

The workpiece W is fed into a space between the male die part 115 and the female die part 111. Then the male die part 115 and the female die part 111 are moved toward the workpiece W to hold the workpiece W between the male corrugated parts 116 of the male die part 115 and the female corrugated parts 112 of the female die part 111 and to compressed the same lightly between the respective pressing surfaces 117a and 113a of the male pressing part 117 and the female pressing part 113. The male corrugated parts 116 and the female corrugated parts 112 hold firmly boundary parts between the adjacent sections 120 of the workpiece W so that an embossing cycle for embossing one of the sections 120 may not affect the section 120 adjacent to the section 120 being subjected to embossing. Therefore, an embossed hollow part 107 formed in the preceding section 120 of the workpiece W is not deformed when the succeeding section 120 is subjected to embossing. By holding the workpiece between the male corrugated parts 116 and the female corrugated parts 112, the corrugations 121 are formed in boundary parts between the adjacent sections 120 of the workpiece W.

Subsequently, the forming die part 118 of the male die part 115 is advanced into the forming recess 114 of the female die part 111 for embossing. Consequently, a part of the section 120 of the workpiece W is embossed to form an embossed hollow part 107. The section 120 of the workpiece W is compressed lightly between the respective pressing surfaces 117a and 113a of the male pressing part 117 and the female pressing part 113 during embossing. Since the pair of cuts 122 are formed in the section 120 of the workpiece W, a part of the section 120 between the cuts 122 is drawn smoothly into the forming recess 114. That is, although the section 120 is held between the male corrugated parts 116 and the female corrugated parts 112, the part of the section 120 between the cuts 122 are relatively free to move, and hence the part of the section 120 between the cuts 122 is movable. Accordingly, the section 120 of the workpiece W can be easily and accurately embossed and the embossed hollow part 107 can be accurately formed in the section 120 of the workpiece W.

After the embossed hollow parts 107 have been thus formed in the sections 120 of the workpiece W, the workpiece W is advanced to feed the section 120 provided with the embossed hollow part 107 into the work pressing machine 130. Then the first die part 131 and the second die part 135 are moved toward the workpiece W to compress the workpiece W between the first die part 131 and the second die part 135. Since the embossed hollow part 107 is received in the recess 134 of the first die part 131, parts excluding the embossed hollow part 107 of the workpiece W are compressed between the first die part 131 and the second die part 135.

Sometimes, parts excluding the embossed hollow part 107 of the workpiece W are crinkled when forming the embossed hollow part 107 by the embossing machine 110. The first die part 131 is heated by the heater 133 to heat the workpiece W properly. Crinkles can be surely taken out of the workpiece W by compressing the properly heated workpiece W between the first die part 131 and the second die part 135.

After thus forming the embossed hollow part 107 in each section 120 and taking crinkles out of the section 120, each section 120 is cut along cutting lines on the inner side of the pair of cuts 122 to divide the workpiece W into individual embossed packaging sheets 105.

As apparent form the foregoing description, the sections 120 of the workpiece w can be accurately embossed to form the embossed hollow parts 107 accurately and crinkles can be surely taken out of the workpiece W.

In the third embodiment, the cuts 122 are formed before the blank section of the workpiece W is fed into the embossing machine 110. The pair of cuts 122 may be formed on the embossing machine 110.

The crinkles can be surely taken out of the workpiece W by compressing the parts excluding the embossed hollow part of the workpiece between the first and the second die part and heating the workpiece by the heated one of the die parts.

What is claimed is:

1. A heat-sealing method comprising the steps of:
   putting a polymer battery module provided with a tab in a pouch package having one unsealed part through the unsealed part so that the tab is placed in the unsealed part of the pouch package; and
   heat-sealing the unsealed part of the pouch package with a pair of sealing heads respectively having sealing surfaces, at least one of which being provided with a recess in a part corresponding to the tab.

2. The heat-sealing method according to claim 1, wherein the package is formed from a laminated structure including, as essential components, a base layer, an adhesive layer, a first chemical conversion coating, a barrier layer, a second chemical conversion coating and an innermost layer.

3. The heat-sealing method according to claim 2, wherein the innermost layer is a polyolefin resin film, and the innermost layer is bonded to the second chemical conversion coating by dry lamination.

4. The heat-sealing method according to claim 2, wherein the laminated structure further includes an acid-modified polyolefin resin layer sandwiched between the second chemical conversion coating and the innermost layer, the innermost layer is formed of a polypropylene resin, and the acid-modified polyolefin layer and the innermost layer formed of the polypropylene resin are laminated by hot lamination at a process temperature not lower than the softening point of the acid-modified polyolefin resin.

5. The heat-sealing method according to claim 2, wherein the laminated structure further includes an extruded resin layer of an acid-modified polyolefin resin sandwiched between the second chemical conversion coating and the innermost layer, the innermost layer is a polyolefin resin film, the extruded resin layer and the innermost layer are laminated to the second chemical conversion coating by sandwich lamination, and the laminated structure is heated at a temperature not lower than the softening point of the acid-modified polyolefin resin.

6. The heat-sealing method according to claim 2, wherein the laminated structure further includes an extruded resin layer of an acid-modified polyolefin resin sandwiched between the second chemical conversion coating and the innermost layer, the innermost layer is formed of a polyolefin resin, the extruded resin layer and the innermost layer are laminated to the second chemical conversion coating by coextrusion, and the laminated structure is heated at a temperature not lower than the softening point of the acid-modified polyolefin resin.

7. A heat-sealing method comprising the steps of:
   putting a polymer battery module provided with a tab in an embossed package; and
   heat-sealing the embossed package with a pair of sealing heads respectively having sealing surfaces, at least one of which being provided with a recess in a part corresponding to the tab.

8. The heat-sealing method according to claim 7, wherein the package is formed from a laminated structure including, as essential components, a base layer, an adhesive layer, a first chemical conversion coating, a barrier layer, a second chemical conversion coating and an innermost layer.

9. The heat-sealing method according to claim 8, wherein the innermost layer is a polyolefin resin film, and the innermost layer is bonded to the second chemical conversion coating by dry lamination.

10. The heat-sealing method according to claim 8, wherein
    the laminated structure further includes an acid-modified polyolefin resin layer sandwiched between the second chemical conversion coating and the innermost layer, the innermost layer is formed of a polypropylene resin, and the acid-modified polyolefin layer and the innermost layer formed of the polypropylene resin are laminated by hot lamination at a process temperature not lower than the softening point of the acid-modified polyolefin resin.

11. The heat-sealing method according to claim 8, wherein
    the laminated structure further includes an extruded resin layer of an acid-modified polyolefin resin sandwiched between the second chemical conversion coating and the innermost layer, the innermost layer is a polyolefin resin film, the extruded resin layer and the innermost layer are laminated to the second chemical conversion coating by sandwich lamination, and the laminated structure is heated at a temperature not lower than the softening point of the acid-modified polyolefin resin.

12. The heat-sealing method according to claim 8, wherein the laminated structure further includes an extruded resin layer of an acid-modified polyolefin resin sandwiched between the second chemical conversion coating and the innermost layer, the innermost layer is formed of a polyolefin resin, the extruded resin layer and the innermost layer are laminated to the second chemical conversion coating by coextrusion, and the laminated structure is heated at a temperature not lower than the softening point of the acid-modified polyolefin resin.

13. A heat-sealing method comprising the steps of:

putting a polymer battery module provided with a tab in a pouch package having at least one unsealed part so that the tab is placed in the unsealed part of the pouch package; and heat-sealing the unsealed part of the pouch package with a pair of sealing heads respectively having sealing surfaces, at least one of which being provided with a recess in a part corresponding to the tab, wherein the polymer battery module is provided with a pair of tabs, and the unsealed part of the pouch package is heat-sealed in a manner where adhesive films are interposed between the tabs and the unsealed part.

14. The heat-sealing method according to claim 13, wherein the package is formed from a laminated structure including, as essential components, a base layer, an adhesive layer, a first chemical conversion coating, a barrier layer, a second chemical conversion coating and an innermost layer.

15. The heat-sealing method according to claim 14, wherein the innermost layer is a polyolefin resin film, and the innermost layer is bonded to the second chemical conversion coating by dry lamination.

16. The heat-sealing method according to claim 14, wherein the laminated structure further includes an acid-modified polyolefin resin layer sandwiched between the second chemical conversion coating and the innermost layer, the innermost layer is formed of a polypropylene resin, and the acid-modified polyolefin layer and the innermost layer formed of the polypropylene resin are laminated by hot lamination at a process temperature not lower than the softening point of the acid-modified polyolefin resin.

17. The heat-sealing method according to claim 14, wherein the laminated structure further includes an extruded resin layer of an acid-modified polyolefin resin sandwiched between the second chemical conversion coating and the innermost layer, the innermost layer is a polyolefin resin film, the extruded resin layer and the innermost layer are laminated to the second chemical conversion coating by sandwich lamination, and the laminated structure is heated at a temperature not lower than the softening point of the acid-modified polyolefin resin.

18. The heat-sealing method according to claim 14, wherein the laminated structure further includes an extruded resin layer of an acid-modified polyolefin resin sandwiched between the second chemical conversion coating and the innermost layer, the innermost layer is formed of a polyolefin resin, the extruded resin layer and the innermost layer are laminated to the second chemical conversion coating by coextrusion, and the laminated structure is heated at a temperature not lower than the softening point of the acid-modified polyolefin resin.

19. The heat-sealing method according to claim 13, wherein each of the adhesive films extend both the pair of tabs.

20. The heat-sealing method according to claim 19, wherein the package is formed from a laminated structure including, as essential components, a base layer, an adhesive layer, a first chemical conversion coating, a barrier layer, a second chemical conversion coating and an innermost layer.

21. The heat-sealing method according to claim 19, wherein the innermost layer is a polyolefin resin film, and the innermost layer is bonded to the second chemical conversion coating by dry lamination.

22. The heat-sealing method according to claim 19, wherein the laminated structure further includes an acid-modified polyolefin resin layer sandwiched between the second chemical conversion coating and the innermost layer, the innermost layer is formed of a polypropylene resin, and the acid-modified polyolefin layer and the innermost layer formed of the polypropylene resin are laminated by hot lamination at a process temperature not lower than the softening point of the acid-modified polyolefin resin.

23. The heat-sealing method according to claim 19, wherein the laminated structure further includes an extruded resin layer of an acid-modified polyolefin resin sandwiched between the second chemical conversion coating and the innermost layer, the innermost layer is a polyolefin resin film, the extruded resin layer and the innermost layer are laminated to the second chemical conversion coating by sandwich lamination, and the laminated structure is heated at a temperature not lower than the softening point of the acid-modified polyolefin resin.

24. The heat-sealing method according to claim 19, wherein the laminated structure further includes an extruded resin layer of an acid-modified polyolefin resin sandwiched between the second chemical conversion coating and the innermost layer, the innermost layer is formed of a polyolefin resin, the extruded resin layer and the innermost layer are laminated to the second chemical conversion coating by coextrusion, and the laminated structure is heated at a temperature not lower than the softening point of the acid-modified polyolefin resin.

25. The heat-sealing method according to claim 19, wherein the adhesive films are formed of an unsaturated carboxylic acid graft propylene resin, a metal-crosslinked polyethylene resin or a copolymer of ethylene or propylene, and an acrylic acid or methacrylic acid.

26. The heat-sealing method according to claim 13, wherein both the sealing surfaces of the sealing head are provided with recesses.

* * * * *